US008505290B2

(12) United States Patent
Sakai et al.

(10) Patent No.: US 8,505,290 B2
(45) Date of Patent: Aug. 13, 2013

(54) DRIVE FOR ROTATING STRUCTURE

(75) Inventors: Toshiyuki Sakai, Osaka (JP); Shigetoshi Shimoo, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 932 days.

(21) Appl. No.: 12/601,658

(22) PCT Filed: May 23, 2008

(86) PCT No.: PCT/JP2008/001299
§ 371 (c)(1), (2), (4) Date: Nov. 24, 2009

(87) PCT Pub. No.: WO2008/149502
PCT Pub. Date: Dec. 11, 2008

(65) Prior Publication Data

US 2010/0162706 A1 Jul. 1, 2010

(30) Foreign Application Priority Data

May 30, 2007 (JP) ................................ 2007-143285

(51) Int. Cl.
*F16D 31/00* (2006.01)

(52) U.S. Cl.
USPC .................................. 60/435; 60/459; 60/711

(58) Field of Classification Search
USPC .................. 60/435, 459, 709, 711, 716, 718; 180/89.13, 65.265; 296/190.04
See application file for complete search history.

(56) References Cited

U.S. PATENT DOCUMENTS

2007/0273316 A1 11/2007 Yoshimatsu et al.

FOREIGN PATENT DOCUMENTS

| | | | |
|---|---|---|---|
| EP | 1731680 | A1 | 12/2006 |
| JP | 9-105151 | A | 4/1997 |
| JP | 2004-360216 | A | 12/2004 |
| JP | 2005-290882 | * | 10/2005 |
| JP | 2005-290902 | A | 10/2005 |
| JP | 2005-344431 | A | 12/2005 |
| JP | 2006-246631 | A | 9/2006 |

* cited by examiner

*Primary Examiner* — F. Daniel Lopez
(74) *Attorney, Agent, or Firm* — Birch, Stewart, Kolasch & Birch, LLP.

(57) ABSTRACT

A hydraulic excavator includes a rotation motor (31) for rotating an upper rotating structure. The rotation motor (31) includes an electric motor (32), a hydraulic motor (40), and a reduction gearbox (33). The hydraulic motor (40) includes a motor mechanism (50) and a clutch mechanism (70). The motor mechanism (50), which is a vane-type hydraulic motor, is engaged with/disengaged from a motor shaft (37) by the clutch mechanism (70). When rotation speed of the upper rotating structure is low, and a required value of output torque of the rotation motor (31) is high, an operation of driving the output shaft (35) by the hydraulic motor (40) is performed in the rotation motor (31).

12 Claims, 14 Drawing Sheets

DRIVE FOR ROTATING STRUCTURE

TECHNICAL FIELD

The present invention relates to a drive for rotating a rotating structure, such as an upper rotating structure, etc. of hydraulic excavators.

BACKGROUND ART

Patent Document 1 discloses a drive for rotating an upper rotating structure of a hydraulic excavator. The drive includes an electric motor for generating drive force. Further, the drive includes a hydraulic motor coupled to an output shaft of the electric motor. The drive uses the hydraulic motor as a brake for stopping the rotation of the rotating structure, thereby quickly stopping the rotating structure having a large inertial force (see paragraphs [0007] and [0010] of Patent Document 1). The drive uses the hydraulic motor to compensate for decrease in torque when the electric motor rotates in a high speed rotation range (see paragraph [0025] of Patent Document 1).

[Patent Document 1] Japanese Patent Publication No. 2005-344431

DISCLOSURE OF THE INVENTION

Problem that the Invention is to Solve

In digging a trench by the hydraulic excavator, for example, excavation may be performed with a bucket of the hydraulic excavator pressed against a side wall of the trench. In this pressing excavation, the drive for driving the upper rotating structure of the hydraulic excavator is required to generate relatively large rotary torque substantially without rotation.

To perform the pressing excavation using the hydraulic excavator including the drive of Patent Document 1, application of a relatively large current to the electric motor substantially in a non-rotating state is required. However, upon application of a relative large current to the electric motor substantially in a non-rotating state, a coil of the electric motor generates a large amount of Joule heat. Therefore, the drive including the electric motor may cause troubles, such as burning of the electric motor, etc., with high probability depending on the operation conditions. Thus, ensuring the reliability of the drive has been difficult.

From this point of view, the present invention has been made. The present invention is directed to a drive for rotating a rotating structure including an electric motor, and intends to suppress heat generation by the electric motor during low-speed rotation, thereby ensuring the reliability of the drive.

Means of Solving the Problem

A first aspect of the invention is directed to a drive for rotating a rotating structure (20) rotatably mounted on a non-rotating structure (11). The drive includes: an electric motor (32) which receives electricity and generates driving force; a hydraulic mechanism (40, 110) which receives hydraulic and generates driving force; and an output shaft (35) which is driven to rotate by the electric motor (32) and the hydraulic mechanism (40, 110), wherein an operation of driving the output shaft (35) only by the hydraulic mechanism (40, 110) can be performed when rotation speed of the rotating structure (20) is lower than a predetermined reference speed, and an operation of driving the output shaft (35) only by the electric motor (32) is performed when the rotation speed of the rotating structure (20) is not lower than the reference speed.

According to the first aspect of the invention, the drive (30) includes the electric motor (32) and the hydraulic mechanism (40, 110). The electric motor (32) and the hydraulic mechanism (40, 110) are both configured to be able to drive the output shaft (35). When the rotation speed of the rotating structure (20) is not lower than the predetermined reference speed, the drive (30) performs the operation of driving the output shaft (35) only by the electric motor (32), and does not perform the operation of driving the output shaft (35) by the hydraulic mechanism (40, 110). On the other hand, when the rotation speed of the rotating structure (20) is lower than the predetermined reference speed, the drive (30) is able to perform the operation of driving the output shaft (35) only by the hydraulic mechanism (40, 110). As the rotation speed of the rotating structure (20) decreases, rotation speed of the output shaft (35) also decreases. Therefore, according to the drive (30) of the present invention, the output shaft (35) can be driven by the hydraulic mechanism (40, 110) in the state where the rotation speed of the rotating structure (20) decreases to a certain extent, and an amount of heat generated by the electric motor (32) may possibly be excessive.

In a second aspect of the invention related to the first aspect of the invention, the operation of driving the output shaft (35) only by the hydraulic mechanism (40, 110) and the operation of driving the output shaft (35) only by the electric motor (32) are selectively performed when the rotation speed of the rotating structure (20) is lower than the reference speed.

According to the second aspect of the invention, any one of the operation of driving the output shaft (35) only by the hydraulic mechanism (40, 110) and the operation of driving the output shaft (35) only by the electric motor (32) is performed in the state where the rotation speed of the rotating structure (20) is lower than the predetermined reference speed. In the operation of driving the output shaft (35) only by the hydraulic mechanism (40, 110), electric power consumed by the electric motor (32) is zero.

In a third aspect of the invention related to the second aspect of the invention, in the case where the rotation speed of the rotating structure (20) is lower than the reference speed, the operation of driving the output shaft (35) only by the hydraulic mechanism (40, 110) is performed when a required value of output torque which is rotary torque of the output shaft (35) is higher than a predetermined reference torque, and the operation of driving the output shaft (35) only by the electric motor (32) is performed when the required value of the output torque is not higher than the reference value.

According to the third aspect of the invention, any one of the operation of driving the output shaft (35) only by the hydraulic mechanism (40, 110) and the operation of driving the output shaft (35) only by the electric motor (32) is selected depending on the required value of the output torque.

According to the third aspect of the invention, the operation of driving the output shaft (35) only by the hydraulic mechanism (40, 110) is performed when the required value of the output torque is higher than the predetermined reference torque. As described above, in driving the output shaft (35) only by the electric motor (32) in the state where the rotation speed of the rotating structure (20) is relatively low and the required value of the output torque is relatively high, an amount of heat generated by the electric motor (32) may possibly be excessive. Therefore, according to the present invention, the output shaft (35) is driven only by the hydraulic mechanism (40, 110) when the rotation speed of the rotating structure (20) is lower than the reference speed, and the required value of the output torque is higher than the reference torque, so as to suppress the heat generation by the electric motor (32).

According to the third aspect of the invention, the operation of driving the output shaft (35) only by the electric motor (32) is performed when the required value of the output torque is not higher than the reference value. Even when the rotation speed of the rotating structure (20) is relatively low, the driving of the output shaft (35) only by the electric motor (32) does not consume the electric power very much as long as the required value of the output torque is not very high. Thus, the amount of heat generated by the electric motor (32) does not increase very much. Therefore, according to the present invention, the output shaft (35) is driven only by the electric motor (32) when the rotation speed of the rotating structure (20) is lower than the reference speed, and the required value of the output torque is not higher than the reference torque.

In a fourth aspect of the invention related to the third aspect of the invention, provided that the reference speed is a higher reference speed, and a value lower than the higher reference speed is a lower reference speed, the reference torque is set to zero when the rotation speed of the rotating structure (20) is not higher than the lower reference speed, and the reference torque is set to a predetermined value higher than zero when the rotation speed of the rotating structure (20) is higher than the lower reference speed and lower than the higher reference speed.

According to the fourth aspect of the invention, the reference torque is set to zero when the rotation speed of the rotating structure (20) is not higher than the lower reference speed. Specifically, when the rotation speed of the rotating structure (20) is not higher than the lower reference speed, the operation of driving the output shaft (35) only by the hydraulic mechanism (40, 110) is performed irrespective of the required value of the output torque. On the other hand, in the case where the rotation speed of the rotating structure (20) is higher than the lower reference speed and lower than the higher reference speed, the operation of driving the output shaft (35) only by the hydraulic mechanism (40, 110) is performed when the required value of the output torque is higher than the reference torque, and the operation of driving the output shaft (35) only by the electric motor (32) is performed when the required value of the output torque is lower than the reference torque.

In a fifth aspect of the invention related to the fourth aspect of the invention, the reference torque is set higher when the rotation speed of the rotating structure (20) is higher in the case where the rotation speed of the rotating structure (20) is higher than the lower reference speed and lower than the higher reference speed.

According to the fifth aspect of the invention, the reference value increases as the rotation speed of the rotating structure (20) increases in the case where the rotation speed of the rotating structure (20) is higher than the lower reference speed and lower than the higher reference speed. Specifically, the reference torque decreases as the rotation speed of the rotating structure (20) decreases. Even if the driving force applied from the electric motor (32) to the output shaft (35) is unchanged, a larger amount of heat is generated by the electric motor (32) when the rotation speed of the rotating structure (20) is lower. Thus, according to the drive (30) of the present invention, the reference torque value is varied depending on the rotation speed of the rotating structure (20).

In a sixth aspect of the invention related to the first aspect of the invention, the operation of driving the output shaft (35) only by the hydraulic mechanism (40, 110) and the operation of driving the output shaft (35) by both of the hydraulic mechanism (40, 110) and the electric motor (32) are selectively performed when the rotation speed of the rotating structure (20) is lower than the reference speed.

According to the sixth aspect of the invention, any one of the operation of driving the output shaft (35) only by the hydraulic mechanism (40, 110) and the operation of driving the output shaft (35) by both of the hydraulic mechanism (40, 110) and the electric motor (32) is performed in the state where the rotation speed of the rotating structure (20) is lower than the predetermined reference speed. In the operation of driving the output shaft (35) by both of the hydraulic mechanism (40, 110) and the electric motor (32), electric power consumption by the electric motor (32) is reduced as compared with the case where the output shaft (35) is driven only by the electric motor (32).

In a seventh aspect of the invention related to the sixth aspect of the invention, in the case where the rotation speed of the rotating structure (20) is lower than the reference speed, the operation of driving the output shaft (35) by both of the hydraulic mechanism (40, 110) and the electric motor (32) is performed when a required value of output torque which is rotary torque of the output shaft (35) is higher than a predetermined reference torque, and the operation of driving the output shaft (35) only by the hydraulic mechanism (40, 110) is performed when the required value of the output torque is not higher than the reference torque.

According to the seventh aspect of the invention, any one of the operation of driving the output shaft (35) only by the hydraulic mechanism (40, 110) and the operation of driving the output shaft (35) by both of the hydraulic mechanism (40, 110) and the electric motor (32) is selected depending on the required value of the output torque. Specifically, according to the drive (30) of the present invention, the operation of driving the output shaft (35) only by the hydraulic mechanism (40, 110) is performed when the required value of the output torque is not higher than the predetermined reference torque. The operation of driving the output shaft (35) by both of the hydraulic mechanism (40, 110) and the electric motor (32) is performed when the required value of the output torque is higher than the predetermined reference torque. As described above, in driving the output shaft (35) only by the electric motor (32) in the state where the rotation speed of the rotating structure (20) is relatively low and the required value of the output torque is relatively high, an amount of heat generated by the electric motor (32) may possibly be excessive. According to the drive (30) of the present invention, the output shaft (35) is driven by both of the hydraulic mechanism (40, 110) and the electric motor (32), thereby reducing the amount of heat generated by the electric motor (32).

In an eighth aspect of the invention related to the seventh aspect of the invention, when the rotation speed of the rotating structure (20) is lower than the reference speed, and the required value of the output torque is not higher than the reference torque, the electric motor (32) is driven by the output shaft (35) to generate electric power, and an amount of the electric power generated by the electric motor (32) is adjusted to adjust the output torque.

According to the eighth aspect of the invention, the amount of electric power generated by the electric motor (32) is adjusted to adjust the output torque in the operation of driving the output shaft (35) only by the hydraulic mechanism (40, 110). Even if the driving force applied from the hydraulic mechanism (40, 110) to the output shaft (35) is constant, the output torque decreases as the amount of electric power generated by the electric motor (32) increases.

In a ninth aspect of the invention related to the eighth aspect of the invention, when the rotation speed of the rotating structure (20) is lower than the reference speed, and the required value of the output torque is not higher than the reference torque, driving torque applied from the hydraulic mechanism (40, 110) to the output shaft (35) is kept constant.

According to the ninth aspect of the invention, driving force applied from the hydraulic mechanism (40, 110) to the output shaft (35) is kept constant in the operation of driving the output shaft (35) only by the hydraulic mechanism (40, 110). In this operation, the amount of electric power generated by the electric motor (32) is adjusted to adjust the output torque of the drive (30). That is, according to the drive (30) of the present invention, the output torque of the drive (30) is adjusted only by adjusting the amount of electric power generated by the electric motor (32), without controlling the output of the hydraulic mechanism (40, 110).

In a tenth aspect of the invention related to the seventh aspect of the invention, when the rotation speed of the rotating structure (20) is lower than the reference speed, and the required value of the output torque is higher than the reference torque, driving torque applied from the hydraulic mechanism (40, 110) to the output shaft (35) is kept constant, and driving torque applied from the electric motor (32) to the output shaft (35) is adjusted to adjust the output torque.

According to the tenth aspect of the invention, driving force applied from the hydraulic mechanism (40, 110) to the output shaft (35) is kept constant in the operation of driving the output shaft (35) by both of the hydraulic mechanism (40, 110) and the electric motor (32). In this operation, the output torque of the drive (30) is adjusted by adjusting driving force applied from the electric motor (32) to the output shaft (35). According to the drive (30) of the present invention, the output torque of the drive (30) is adjusted only by controlling the output of the electric motor (32), without controlling the output of the hydraulic mechanism (40, 110).

In an eleventh aspect of the invention related to any one of the first to tenth aspects of the invention, the electric motor (32) is always coupled to the output shaft (35), and the hydraulic mechanism (40, 110) is configured to be able to engage with/disengage from the output shaft (35).

According to the eleventh aspect of the invention, the electric motor (32) is always coupled to the output shaft (35). Whether the output shaft (35) is driven by the electric motor (32) or not, a rotor of the electric motor (32) rotates together with the output shaft (35) of the drive (30). The hydraulic mechanism (40, 110) is configured to be able to engage with/disengage from the output shaft (35). In the operation of driving the output shaft (35) by the hydraulic mechanism (40, 110), the hydraulic mechanism (40, 110) is coupled to the output shaft (35). In the operation of driving the output shaft (35) by the electric motor (32) (i.e., in the operation of not driving the output shaft (35) by the hydraulic mechanism (40, 110)), the hydraulic mechanism (40, 110) is disengaged from the output shaft (35). Thus, the hydraulic mechanism (40, 110) in this state does not consume any rotary power of the output shaft (35).

In a twelfth aspect of the invention related to any one of the first to tenth aspects of the invention, both of the electric motor (32) and the hydraulic mechanism (40, 110) are always coupled to the output shaft (35), and the hydraulic mechanism (40) is configured to be able to switch between a driving operation of receiving the hydraulic fluid and driving the output shaft (35) to rotate, and an idling operation of being driven by the output shaft (35) to idle.

According to the twelfth aspect of the invention, both of the electric motor (32) and the hydraulic mechanism (40) are always coupled to the output shaft (35). Whether the output shaft (35) is driven by the electric motor (32) or not, a rotor of the electric motor (32) rotates together with the output shaft (35) of the drive (30). The hydraulic mechanism (40) can be switched between the driving operation and the idling operation.

According to the twelfth aspect of the invention, in the operation of driving the output shaft (35) by the hydraulic mechanism (40), the hydraulic mechanism (40) performs the driving operation, thereby transmitting the driving force generated by the hydraulic mechanism (40) to the output shaft (35) of the drive (30). In the operation of driving the output shaft (35) by the electric motor (32) (i.e., in the operation of not driving the output shaft (35) by the hydraulic mechanism (40)), the hydraulic mechanism (40) performs the idling operation. In the idling operation, the hydraulic mechanism (40) coupled to the output shaft (35) of the drive (30) idles. Specifically, in the idling operation, the hydraulic mechanism (40) is driven by the output shaft (35) to idle with substantially no consumption of rotary power of the output shaft (35).

EFFECT OF THE INVENTION

According to the drive (30) of the present invention, the output shaft (35) can be driven by the hydraulic mechanism (40, 110) in the state where the rotation speed of the rotating structure (20) decreases to a certain extent, and an amount of heat generated by the electric motor (32) may possibly be excessive. When the rotation speed of the rotating structure (20) is low, and the output shaft (35) is driven by both of the hydraulic mechanism (40, 110) and the electric motor (32), electric current flowing to the electric motor (32) can be reduced as compared with the case where the output shaft (35) is driven only by the electric motor (32). Further, driving the output shaft (35) only by the hydraulic mechanism (40, 110) reduces the electric power consumed by the electric motor (32) to zero. Therefore, according to the present invention, even when the rotation speed of the rotating structure (20) decreases to a certain extent, the amount of heat generated by the electric motor (32) can be reduced, thereby preventing troubles, such as burning of the electric motor (32), etc., in advance.

According to the second aspect of the invention, any one of the hydraulic mechanism (40, 110) and the electric motor (32) drives the output shaft (35) when the rotation speed of the rotating structure (20) is lower than the predetermined reference speed. Therefore, in the state where the rotation speed of the rotating structure (20) decreases to a certain extent, the amount of heat generated by the electric motor (32) can be reduced by driving the output shaft (35) only by the hydraulic mechanism (40, 110).

According to the third aspect of the invention, when the required value of the output torque is higher than the predetermined reference torque, the operation of driving the output shaft (35) only by the hydraulic mechanism (40, 110) is performed. When the required value of the output torque is not higher than the reference torque, the operation of driving the output shaft (35) only by the electric motor (32) is performed. Therefore, in the state where the rotation speed of the rotating structure (20) is relatively low, and the required value of the output torque is relatively high, i.e., in the state where the driving of the output shaft (35) only by the electric motor (32) may possibly lead to excessive heat generation by the electric motor (32), the output shaft (35) is driven only by the hydraulic mechanism (40, 110), thereby reliably reducing the amount of heat generated by the electric motor (32).

According to the fourth and fifth aspects of the invention, when the rotation speed of the rotating structure (20) is not higher than the lower reference speed, the output shaft (35) is always driven only by the hydraulic mechanism (40, 110) irrespective of the required value of the output torque. This makes it possible to more reliably reduce the amount of heat generated by the electric motor (32), and to more reliably prevent troubles derived from the heat generation by the electric motor (32).

According to the sixth aspect of the invention, when the rotation speed of the rotating structure (20) is lower than the predetermined reference speed, the operation of driving the output shaft (35) by both of the hydraulic mechanism (40, 110) and the electric motor (32) can be performed. Therefore, when the rotation speed of the rotating structure (20) decreases to a certain extent, the amount of heat generated by the electric motor (32) can be reduced by driving the output shaft (35) by both of the hydraulic mechanism (40, 110) and the electric motor (32).

According to the seventh to tenth aspects of the invention, when the rotation speed of the rotating structure (20) is relatively low, and the required value of the output torque is relatively high, the output shaft (35) is driven by both of the hydraulic mechanism (40, 110) and the electric motor (32). This makes it possible to more reliably reduce the amount of heat generated by the electric motor (32).

In particular, according to the eighth and ninth aspects of the invention, the amount of electric power generated by the electric motor (32) is adjusted in the operation of driving the output shaft (35) only by the hydraulic mechanism (40, 110), thereby adjusting the output torque of the drive (30). According to the tenth aspect of the invention, the output of the electric motor (32) is adjusted in the operation of driving the output shaft (35) by both of the hydraulic mechanism (40, 110) and the electric motor (32), thereby adjusting the output torque of the drive (30). Therefore, according to the eighth, ninth, and tenth aspects of the invention, the output torque of the drive (30) can be adjusted only by controlling the output of the electric motor (32), without controlling the output of the hydraulic mechanism (40, 110), and therefore, the control of the drive (30) can be simplified.

According to the eleventh aspect of the invention, when the output shaft (35) is not driven by the hydraulic mechanism (40, 110), the hydraulic mechanism (40, 110) is disengaged from the output shaft (35). According to the twelfth aspect of the invention, when the output shaft (35) is not driven by the hydraulic mechanism (40), the hydraulic mechanism (40) coupled to the output shaft (35) idles. Therefore, according to these aspects of the invention, rotary power of the output shaft (35) consumed by the hydraulic mechanism (40, 110) in the operation of driving the output shaft (35) by the electric motor (32) can be reduced, thereby suppressing decrease in efficiency of the drive (30).

DESCRIPTION OF CHARACTERS

Figure 1:
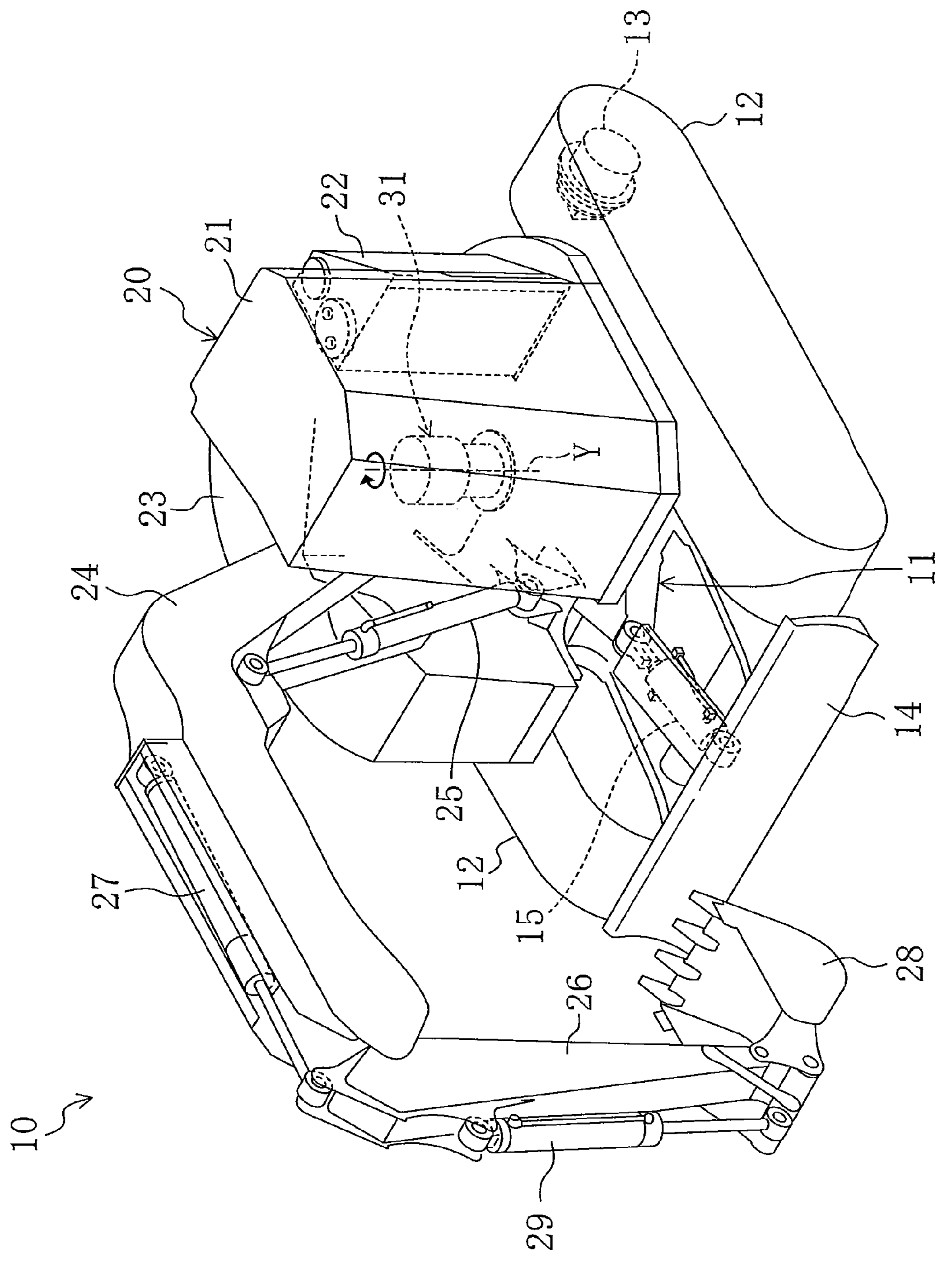
FIG. 1 is a schematic perspective view illustrating a structure of a hydraulic excavator.

10 Hydraulic excavator
11 Undercarriage (non-rotating structure)
20 Upper rotating structure (rotating structure)
31 Rotation motor
32 Electric motor (motor)
35 Output shaft
40 Hydraulic motor (hydraulic mechanism)
110 Auxiliary drive mechanism (hydraulic mechanism)

BEST MODE FOR CARRYING OUT THE INVENTION

Embodiments of the present invention will be described in detail hereinafter with reference to the drawings.

First Embodiment

A first embodiment of the present invention will be described. The present embodiment is directed to a hydraulic excavator (10) including a drive (30) of the present invention.

The hydraulic excavator (10) of the present embodiment is a so-called series hybrid vehicle. Specifically, in this hydraulic excavator (10), an electric power generator is driven by an internal combustion engine, electric power generated by the electric power generator is stored in a battery, and a hydraulic pump is driven by an electric motor fed by the battery. The hydraulic excavator (10) travels and excavates using high-pressure hydraulic fluid discharged from the hydraulic pump.

<General Structure of Hydraulic Excavator>

As shown in FIG. 1, the hydraulic excavator (10) includes an undercarriage (11) which is a non-rotating structure, and an upper rotating structure (20) which is a rotating structure. The upper rotating structure (20) is rotatably mounted on the undercarriage (11).

The undercarriage (11) includes crawlers (12) provided on the right and left sides thereof, respectively, and a blade (14) attached to the front side thereof for leveling the ground, etc. The undercarriage (11) further includes a hydraulic travel motor (13) for driving the crawlers (12), and a hydraulic cylinder (15) for driving the blade (14).

The upper rotating structure (20) includes an operator cabin (21) for forming space for an operator, a hydraulic fluid tank (22) for storing the hydraulic fluid, and a machine cab (23) for containing an internal combustion engine, an electric power generator, a battery, etc. The internal combustion engine and the like contained in the machine cab (23) are omitted from the drawings.

The upper rotating structure (20) further includes a boom (24), an arm (26), and a bucket (28). The boom (24) has a proximal end pivotably attached to the upper rotating structure (20), and is driven by a hydraulic cylinder (25). The arm (26) has a proximal end pivotably attached to a distal end of the boom (24), and is driven by a hydraulic cylinder (27). The bucket (28) has a proximal end pivotably attached to a distal end of the arm (26), and is driven by a hydraulic cylinder (29).

The upper rotating structure (20) further includes a rotation motor (31). The rotation motor (31) constitutes a drive (30) together with a controller (100). The rotation motor (31) and the controller (100) will be described later in detail.

Figure 2:
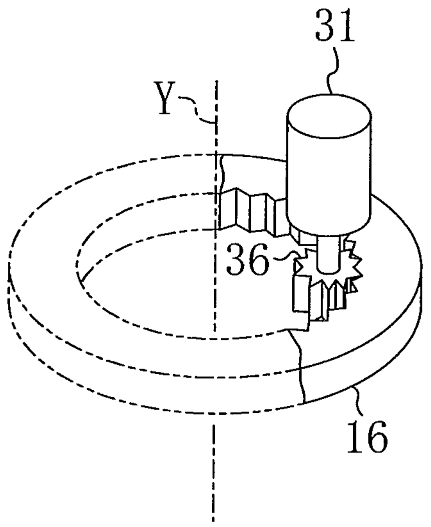
FIG. 2 is a schematic perspective view of a major part of the hydraulic excavator illustrating arrangement of a rotation motor and an internal gear.

As shown in FIG. 2, the rotation motor (31) is substantially cylindrical-shaped, and is attached to the upper rotating structure (20) in such a manner that a pinion (36) attached to an output shaft (35) thereof is located below the rotation motor (31). The undercarriage (11) includes an internal gear (16) (see FIG. 2). The internal gear (16) is in the shape of an annular ring, and is arranged coaxially with a rotation axis Y of the upper rotating structure (20). Teeth are formed in an inner circumferential surface of the internal gear (16) to engage with the pinion (36) of the rotation motor (31).

<Rotation Motor>

Figure 3:
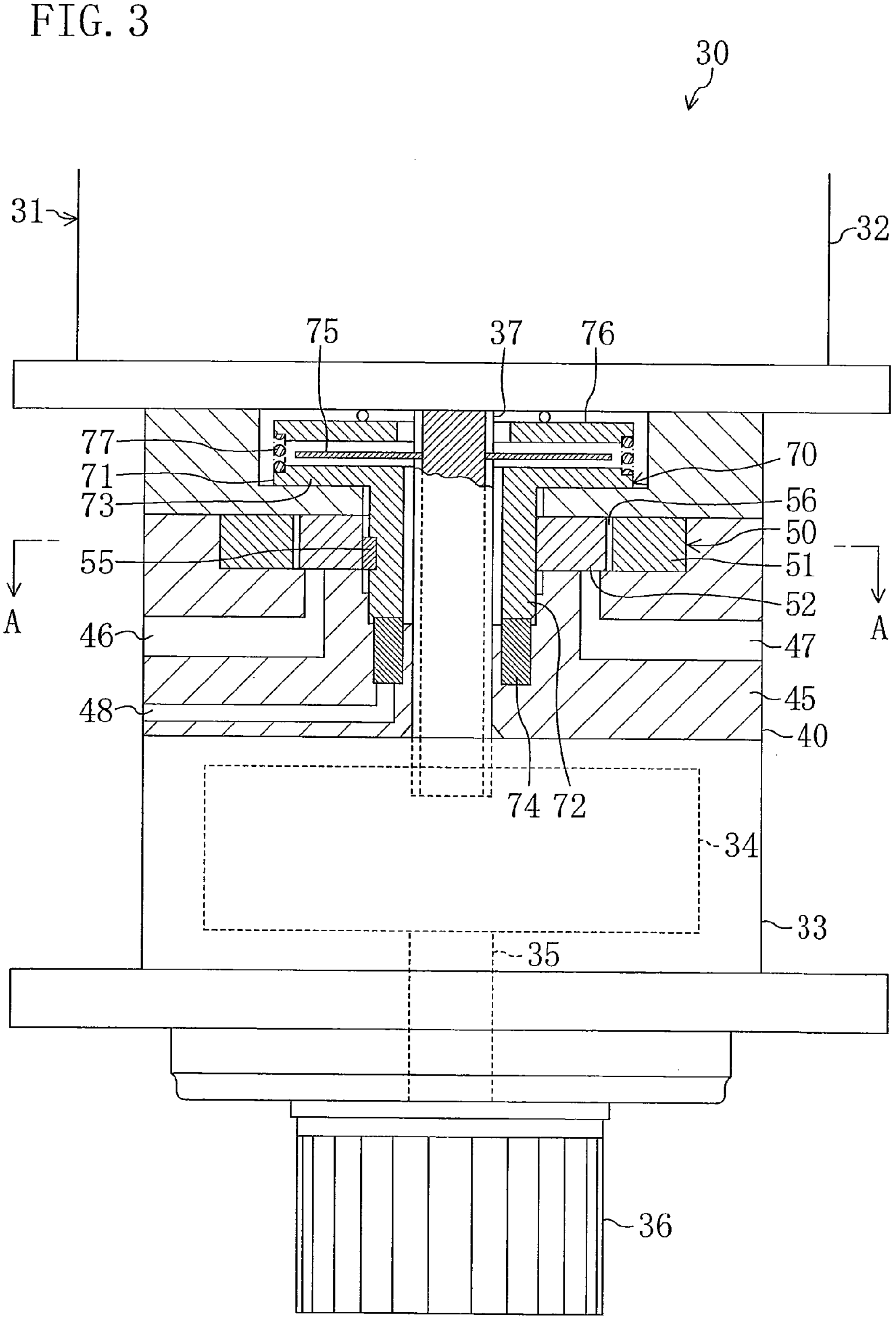
FIG. 3 is a partial cross-sectional view of a rotation motor illustrating the structure of a hydraulic motor of a first embodiment, and a clutch mechanism in a disengaged state.

As shown in FIG. 3, the rotation motor (31) includes an electric motor (32), a hydraulic motor (40) as a hydraulic mechanism, a reduction gearbox (33), and an output shaft (35). In this rotation motor (31), the reduction gearbox (33), the hydraulic motor (40), and the electric motor (32) are sequentially arranged from the bottom to the top. Although not shown, the rotation motor (31) further includes a brake for preventing rotation of the output shaft (35).

The electric motor (32) and the hydraulic motor (40) share a single motor shaft (37). The motor shaft (37) is always coupled to a rotor of the electric motor (32). A lower end of the motor shaft (37) is coupled to an input side of a planetary gear mechanism (34) of the reduction gearbox (33). An upper end of the output shaft (35) is coupled to an output side of the planetary gear mechanism (34). The pinion (36) is attached to a lower end of the output shaft (35). The pinion (36) protrudes from a lower surface of the reduction gearbox (33), and engages with the internal gear (16).

The hydraulic motor (40) includes a housing (45), a motor mechanism (50), and a clutch mechanism (70). The housing (45) is substantially cylindrical-shaped, and contains the motor mechanism (50) and the clutch mechanism (70).

Figure 5:
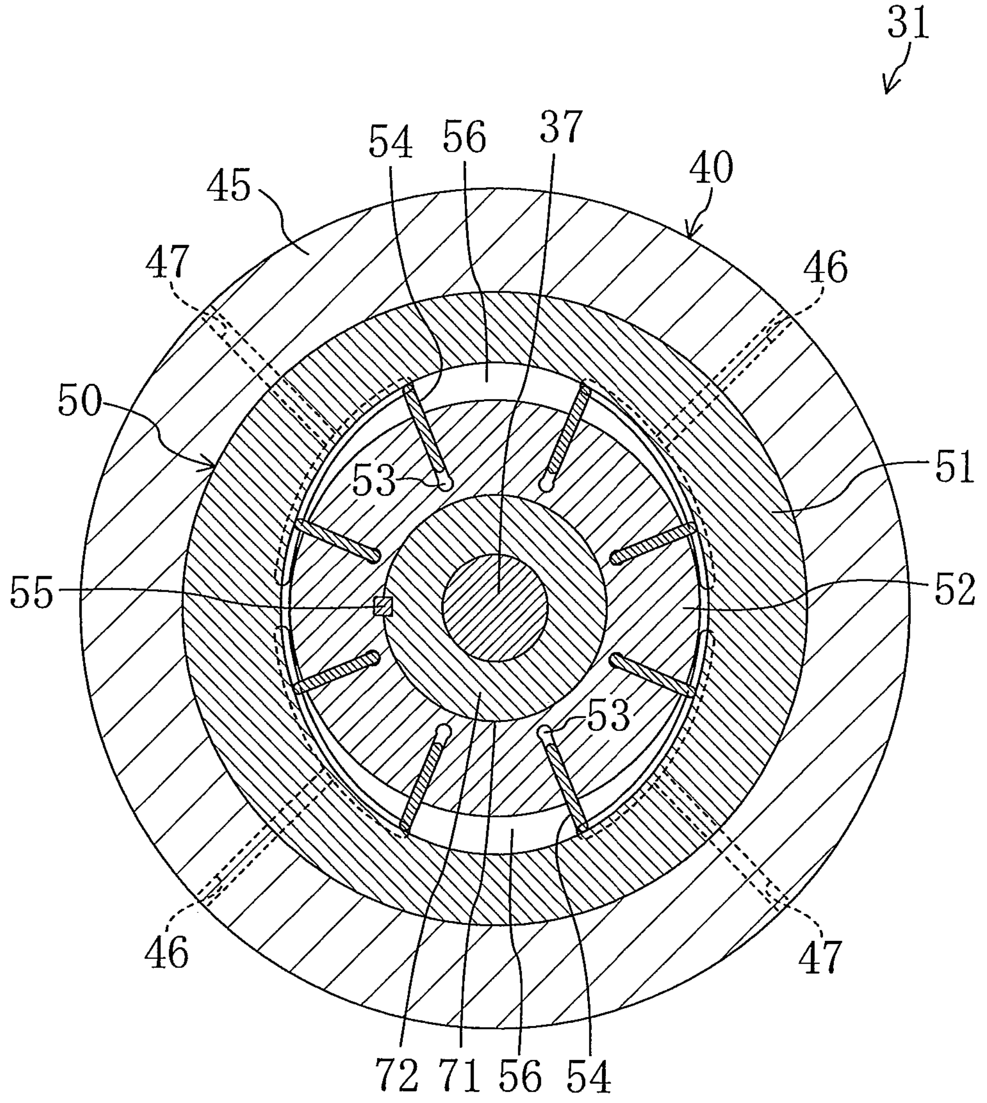
FIG. 5 is a cross-sectional view taken along the line A-A of FIG. 3 illustrating the structure of the hydraulic motor of the first embodiment.

As also shown in FIG. 5, the motor mechanism (50) constitutes a so-called vane-type hydraulic motor. The motor mechanism (50) includes a cam ring (51), a rotor (52), and eight vanes (54). The number of the vanes (54) is merely indicated as an example.

The cam ring (51) is in the shape of an annular ring having a rectangular cross section, and has an inner circumferential surface in the form of an ellipse when viewed in the axial direction. The cam ring (51) is arranged coaxially with the motor shaft (37). Further, the cam ring (51) is arranged with the major axis of the elliptical inner circumferential surface corresponding to the vertical direction of FIG. 5.

The rotor (52) is in the shape of an annular ring having a rectangular cross section, and is arranged inside the cam ring (51). Similarly to the cam ring (51), the rotor (52) is arranged coaxially with the motor shaft (37). A hydraulic fluid chamber (56) is formed between an outer circumferential surface of the rotor (52) and the inner circumferential surface of the cam ring (51).

The rotor (52) is provided with a guiding groove (53) extending radially inwardly from the outer circumferential surface thereof. The rotor (52) includes eight guiding grooves (53) extending radially at regular angular intervals. Each of the guiding grooves (53) is a slit-like groove of a constant width. However, each of the guiding grooves (53) is widened to some extent at the bottom thereof (at an end close to the center of the rotor (52)).

A flat vane (54) is inserted in each of the guiding grooves (53). The vane (54) inserted in each guiding groove (53) of the rotor (52) is able to move back and forth in the radial direction of the rotor (52). When a hydraulic pressure of the hydraulic fluid is exerted on space between the bottom of the guiding groove (53) and the vane (54), the vane (54) is pushed outwardly from the rotor (52), and a tip end of the vane (54) is pushed toward the inner circumferential surface of the cam ring (51). The hydraulic fluid chamber (56) is divided by the eight vanes (54).

The clutch mechanism (70) includes an engagement/disengagement member (71), an engagement/disengagement piston (74), a friction disc (75), and a thrust bearing (76).

The engagement/disengagement member (71) includes a cylindrical part (72) in the shape of a cylinder (or a tube), and a flange part (73) extending outwardly from an upper end of the cylindrical part (72). The cylindrical part (72) is freely fitted on the motor shaft (37). The engagement/disengagement member (71) is rotatable in the circumferential direction of the motor shaft (37), and is slidable in the axial direction of the motor shaft (37). The cylindrical part (72) is inserted in the rotor (52), and is coupled to the rotor (52) by a key (55). The engagement/disengagement member (71) rotates together with the rotor (52), and is slidable in the axial direction of the rotor (52).

The engagement/disengagement piston (74) is in the shape of a slightly thick-walled, short tube. The engagement/disengagement piston (74) is arranged below the engagement/disengagement member (71), and is slidable in the axial direction of the engagement/disengagement member (71). An upper end surface of the engagement/disengagement piston (74) abuts a lower end surface of the cylindrical part (72) of the engagement/disengagement member (71). When a hydraulic pressure is exerted on the lower end surface of the engagement/disengagement piston (74), the engagement/disengagement piston (74) moves upward, thereby pushing the engagement/disengagement member (71) upward.

The friction disc (75) is a thin disc, and is arranged to face an upper surface of the flange part (73) of the engagement/disengagement member (71). The friction disc (75) engages with a spline formed in the motor shaft (37). Therefore, the friction disc (75) rotates together with the motor shaft (37), and is slidable in the axial direction of the motor shaft (37).

The thrust bearing (76) is attached to a lower surface of the electric motor (32), and a lower surface of the thrust bearing (76) faces an upper surface of the friction disc (75). A coil spring (77) is arranged between the thrust bearing (76) and the flange part (73) of the engagement/disengagement member (71). An outer diameter of the coil spring (77) is substantially equal to that of the thrust bearing (76), and that of the flange part (73) of the engagement/disengagement member (71). The coil spring (77) is arranged between the thrust bearing (76) and the engagement/disengagement member (71) in a compressed state, and abuts a peripheral portion of the thrust bearing (76) and a peripheral portion of the flange part (73).

A first port (46), a second port (47), and a pilot port (48) are formed in the housing (45) of the hydraulic motor (40). The three ports (46, 47, 48) are connected to a hydraulic circuit (80) described later.

As shown in FIG. 5, an end of the first port (46) and an end of the second port (47) form recesses extending along the inner circumferential surface of the cam ring (51), respectively. Two ends of two first ports (46) are arranged in an upper right portion and a lower left portion in FIG. 5, respectively. Two ends of two second ports (47) are arranged in an upper left portion and a lower right portion in FIG. 5, respectively.

Figure 4:
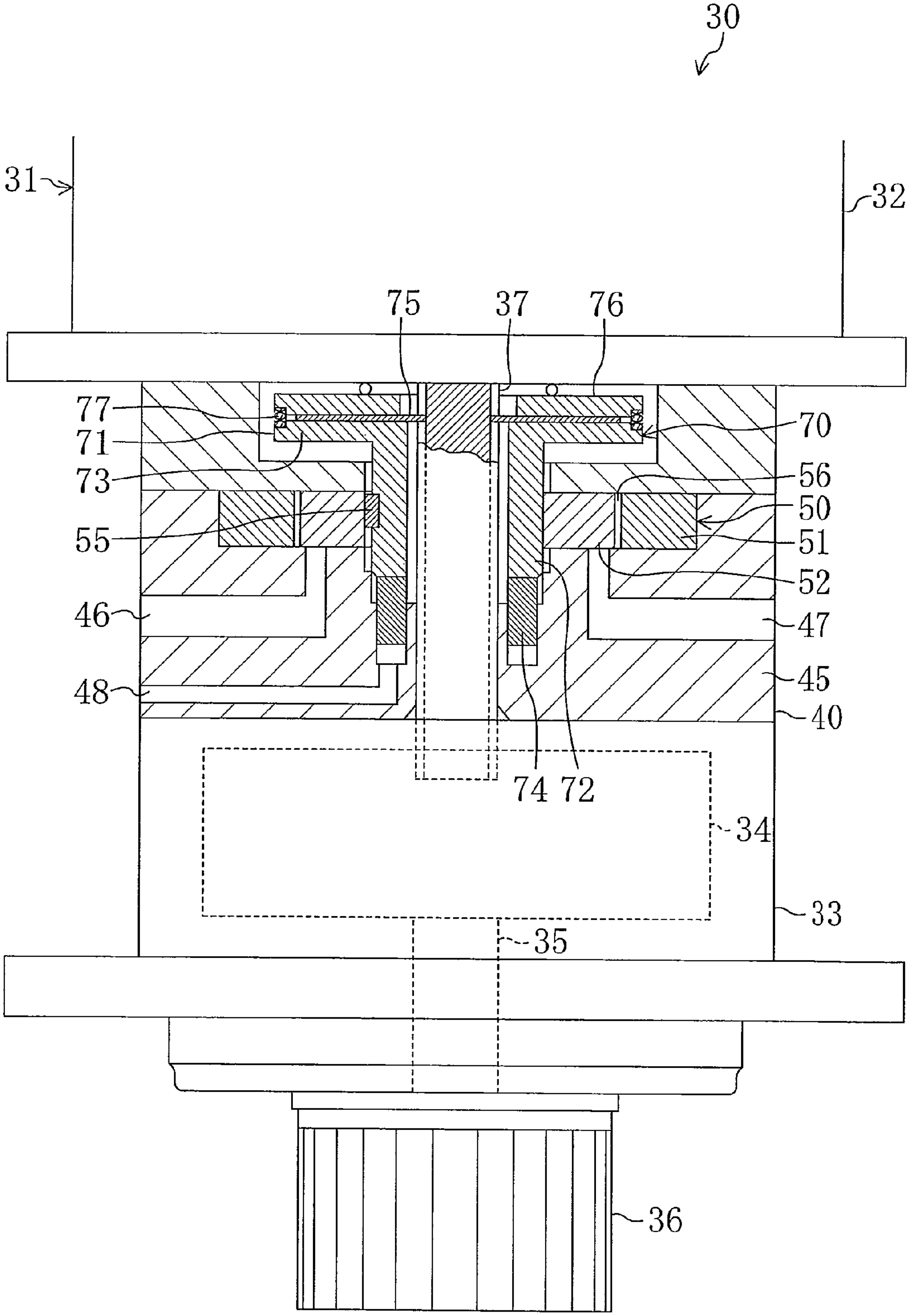
FIG. 4 is a partial cross-sectional view of the rotation motor illustrating the structure of the hydraulic motor of the first embodiment, and the clutch mechanism in an engaged state.

An end of the pilot port (48) is opened to face a lower end surface of the engagement/disengagement piston (74). Hydraulic fluid supplied through the pilot port (48) pushes the engagement/disengagement piston (74) upward. As shown in FIG. 4, when the engagement/disengagement piston (74) pushes the engagement/disengagement member (71) to move upward, the friction disc (75) is sandwiched between the flange part (73) of the engagement/disengagement member (71) and the thrust bearing (76), and the rotor (52) of the motor mechanism (50) is coupled to the motor shaft (37) through the engagement/disengagement member (71) and the friction disc (75).

<Hydraulic Circuit>

A hydraulic circuit (80) will be described with reference to FIGS. 6 and 7. The hydraulic circuit (80) is a circuit in which the hydraulic fluid flows, and is connected to a hydraulic motor (40) of a rotation motor (31).

The hydraulic circuit (80) includes a first main path (81), a second main path (82), a main supply path (83), and a main discharge path (84). An end of the first main path (81) and an end of the second main path (82) are connected to a switching valve (91). The other end of the first main path (81) is connected to the first port (46) of the hydraulic motor (40). The other end of the second main path (82) is connected to the second port (47) of the hydraulic motor (40). Relief valves (94, 95) are connected to the first main path (81) and the second main path (82), respectively. An end of the main supply path (83) and an end of the main discharge path (84) are connected to the switching valve (91). The other end of the main supply path (83) is connected to a hydraulic pressure source (88), such as a hydraulic pump, etc. The other end of the main discharge path (84) is connected to the hydraulic fluid tank (22).

The switching valve (91) is a so-called pilot-operated spool valve. As a spool moves, the switching valve (91) is switched between a neutral state (a state shown in FIG. 6) in which the first main path (81) and the second main path (82) are disconnected from the main supply path (83) and the main discharge path (84), a first state (a state shown in FIG. 7) in which first main path (81) communicates with the main supply path (83), and the second main path (82) communicates with the main discharge path (84), and a second state (not shown) in which the first main path (81) communicates with the main discharge path (84), and the second main path (82) communicates with the main supply path (83).

A switching solenoid valve (92) for driving the spool is connected to the switching valve (91). The switching solenoid valve (92) is arranged about midway of a first switching path (86) and a second switching path (87) connected to the switching valve (91). In the switching valve (91), the first switching path (86) connected to an end of the spool, and the second switching path (87) is connected to the other end of the spool. The switching solenoid valve (92) connects/disconnects the first switching path (86) and the second switching path (87) to/from an operation device (96) described later. When the switching solenoid valve (92) is in an ON state (the state shown in FIG. 7), an end of the first switching path (86) and an end of the second switching path (87) are connected a pilot hydraulic pressure source (89), such as a hydraulic pump, etc., and the other ends thereof are connected to the hydraulic fluid tank (22).

The hydraulic circuit (80) further includes a pilot path (85). An end of the pilot path (85) is connected to the pilot port (48) of the hydraulic motor (40), and the other end is connected to a pilot valve (93). The pilot valve (93) is constituted of a solenoid valve, and is switched between an OFF state (the state shown in FIG. 6) in which the pilot path (85) communicates with the hydraulic fluid tank (22), and an ON state (the state shown in FIG. 7) in which the pilot path (85) communicates with the pilot hydraulic pressure source (89).

The operation device (96) includes a control lever (97) operated by an operator of the hydraulic excavator (10). When the operator operates the control lever (97), the operation device (96) outputs a corresponding command signal to a controller (100). Details of the controller (100) will be described later. The operation device (96) allows switching between a state in which the first switching path (86) is connected to the pilot hydraulic pressure source (89), and the second switching path (87) is connected to the hydraulic fluid tank (22), and a state in which the first switching path (86) is connected to the hydraulic fluid tank (22), and the second switching path (87) is connected to the pilot hydraulic pressure source (89).

<Controller>

As described above, the command signal from the operation device (96) is input to the controller (100). The controller (100) outputs a control signal to the switching solenoid valve (92), the pilot valve (93), and the electric motor (32) of the rotation motor (31) in response to the command signal input by the operation device (96).

A control map for controlling the rotation motor (31) is stored in the controller (100). The control map will be described with reference to FIG. 8.

The control map is represented by Cartesian coordinates, in which a horizontal axis represents "rotation speed (rate of rotation) of the upper rotating structure (20)", and a vertical axis represents "an absolute value of torque of the output shaft of the rotation motor (31) (i.e., rotary torque of the output shaft (35))." In this control map, a reference torque line (105) is given. The reference torque line (105) represents a value of reference torque $T_b$ as a function of the rotation speed R of the upper rotating structure (20). The reference torque line (105) is expressed by the following equations. In the equations, $R_L$ indicates a lower reference torque, and $R_H$ indicates a higher reference torque, where $R_L<R_H$. $T_{max}$ indicates a maximum value of the output shaft torque of the rotation motor (31).

$$\text{When } R<R_L,\ T_b=0\text{(zero)}$$

$$\text{When } R_L \leqq R \leqq R_H,\ T_b=\{T_{max}/(R_H-R_L)\}R-\{R_L/(R_H-R_L)\}T_{max}$$

$$\text{When } R_H<R,\ T_b=T_{max}$$

The control map is configured in such a manner that the rotation motor (31) performs an operation of driving the output shaft (35) only by the hydraulic motor (40) when $T_b<T\leqq T_{max}$, and that the rotation motor (31) performs an operation of driving the output shaft (35) only by the electric motor (32) when $T \leqq T_b$. T indicates a required value of the output shaft torque of the rotation motor (31).

Specifically, when $R<R_H$, the control map is configured to select one of the operation of driving the output shaft (35) only by the hydraulic motor (40) and the operation of driving the output shaft (35) only by the electric motor (32) depending on the required value T of the output shaft torque. The output torque of the rotation motor (31) is torque of the output shaft of the rotation motor (31) when the upper rotating structure (20) is driven by the rotation motor (31) (i.e., when the rotation motor (31) applies driving force to the upper rotating structure (20)).

—Operation Mechanism—

An operation mechanism of the hydraulic excavator (10) will be described. Here, among the operations performed by the hydraulic excavator (10), an operation of the drive (30) and the hydraulic circuit (80) will be described.

<Hydraulic Motor, Hydraulic Circuit>

An operation of the hydraulic motor (40) of the rotation motor (31) and an operation of the hydraulic circuit (80) will be described.

Figure 7:
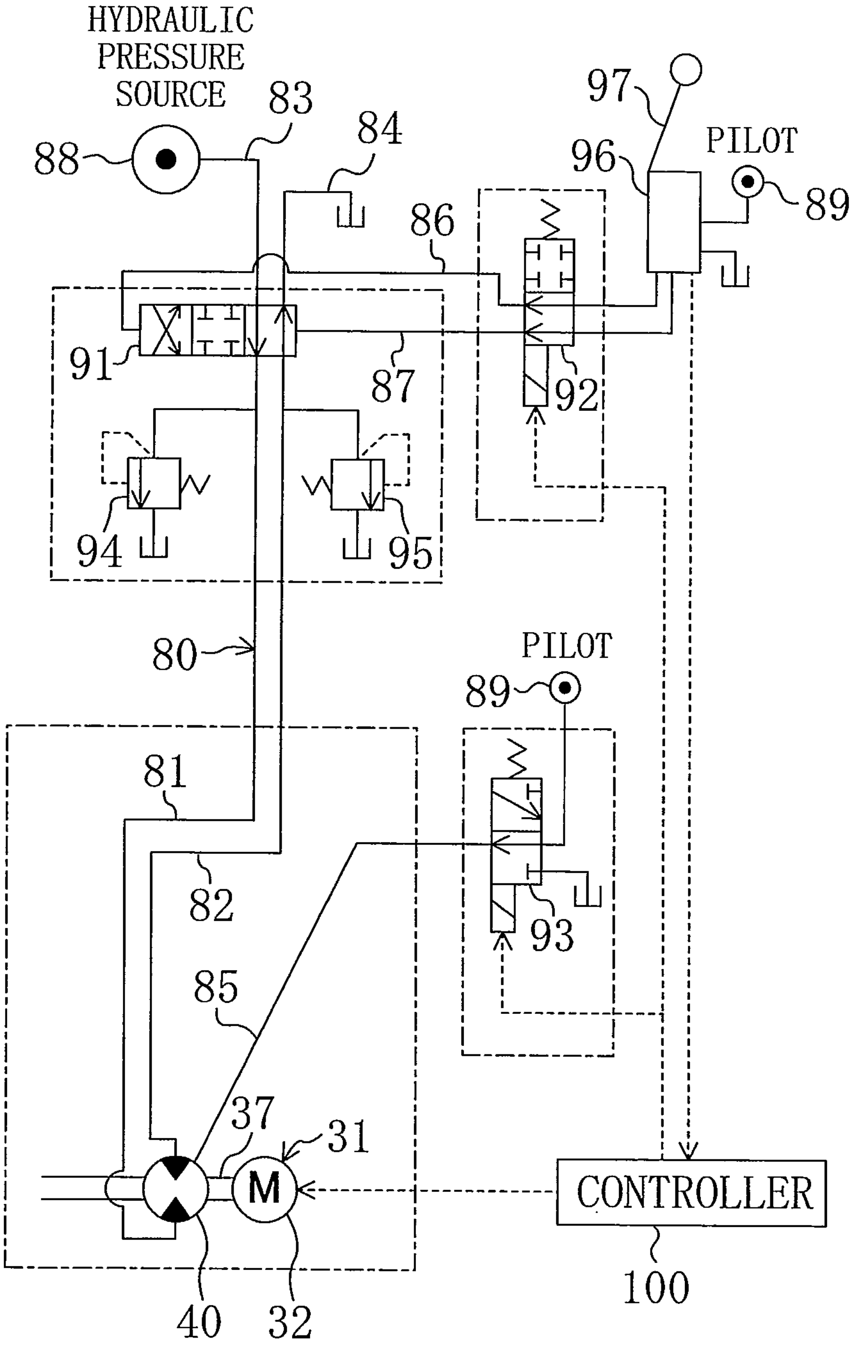
FIG. 7 is a hydraulic circuit diagram illustrating the structure of the hydraulic circuit and the switching valve, etc., when the hydraulic motor is operating.

When the rotation motor (31) performs the operation of driving the output shaft (35) by the hydraulic motor (40), the switching solenoid valve (92) and the pilot valve (93) of the hydraulic circuit (80) are set to the ON state shown in FIG. 7 in response to the control signal sent from the controller (100). When the switching solenoid valve (92) is set to the ON state, the first switching path (86) and the second switching path (87) are opened. When the first switching path (86) and the second switching path (87) are opened, the spool of the switching valve (91) moves, thereby connecting one of the first main path (81) and the second main path (82) to the hydraulic pressure source (88), and connecting the other to the hydraulic fluid tank (22). In this description, the case in which the switching valve (91) is set to the first state (the state shown in FIG. 7), the first main path (81) is connected to the hydraulic pressure source (88), and the second main path (82) is connected to the hydraulic fluid tank (22) is taken as an example. When the pilot valve (93) is set to the ON state, the pilot path (85) is connected to the pilot hydraulic pressure source (89).

When the pilot path (85) is connected to the pilot hydraulic pressure source (89), hydraulic fluid flows from the pilot path (85) to the pilot port (48) of the hydraulic motor (40), and pushes the engagement/disengagement piston (74) upward (see FIG. 4). The engagement/disengagement piston (74) pushes the engagement/disengagement member (71), and the engagement/disengagement member (71) moves upward to compress the coil spring (77). When the engagement/disengagement member (71) moves upward, the friction disc (75) is sandwiched between the flange part (73) of the engagement/disengagement member (71) and the thrust bearing (76), and the rotor (52) of the motor mechanism (50) is coupled to the motor shaft (37) through the engagement/disengagement member (71) and the friction disc (75).

In the hydraulic motor (40), the first port (46) is connected to the hydraulic pressure source (88) through the first main path (81) of the hydraulic circuit (80), and the second port (47) is connected to the hydraulic fluid tank (22) through the second main path (82) of the hydraulic circuit (80). The high pressure hydraulic fluid sent from the hydraulic pressure source (88) flows to a portion of the hydraulic fluid chamber (56) communicating with the first port (46). The hydraulic pressure of the hydraulic fluid entered the hydraulic fluid chamber (56) is exerted on the side surface of the vane (54), thereby rotating the rotor (52) to the left in FIG. 5. The hydraulic fluid entered the hydraulic fluid chamber (56) moves as the rotor (52) rotates, and flows into the second port (47). The hydraulic fluid entered the second port (47) passes through the second main path (82) of the hydraulic circuit (80), and returns to the hydraulic fluid tank (22).

When the switching valve (91) is set to the second state in which the first main path (81) communicates with the main discharge path (84), and the second main path (82) communicates with the main supply path (83), the high pressure hydraulic fluid flowing from the hydraulic pressure source (88) enters a portion of the hydraulic fluid chamber (56) communicating with the second port (47), thereby rotating the rotor (52) to the right in FIG. 5.

Figure 6:
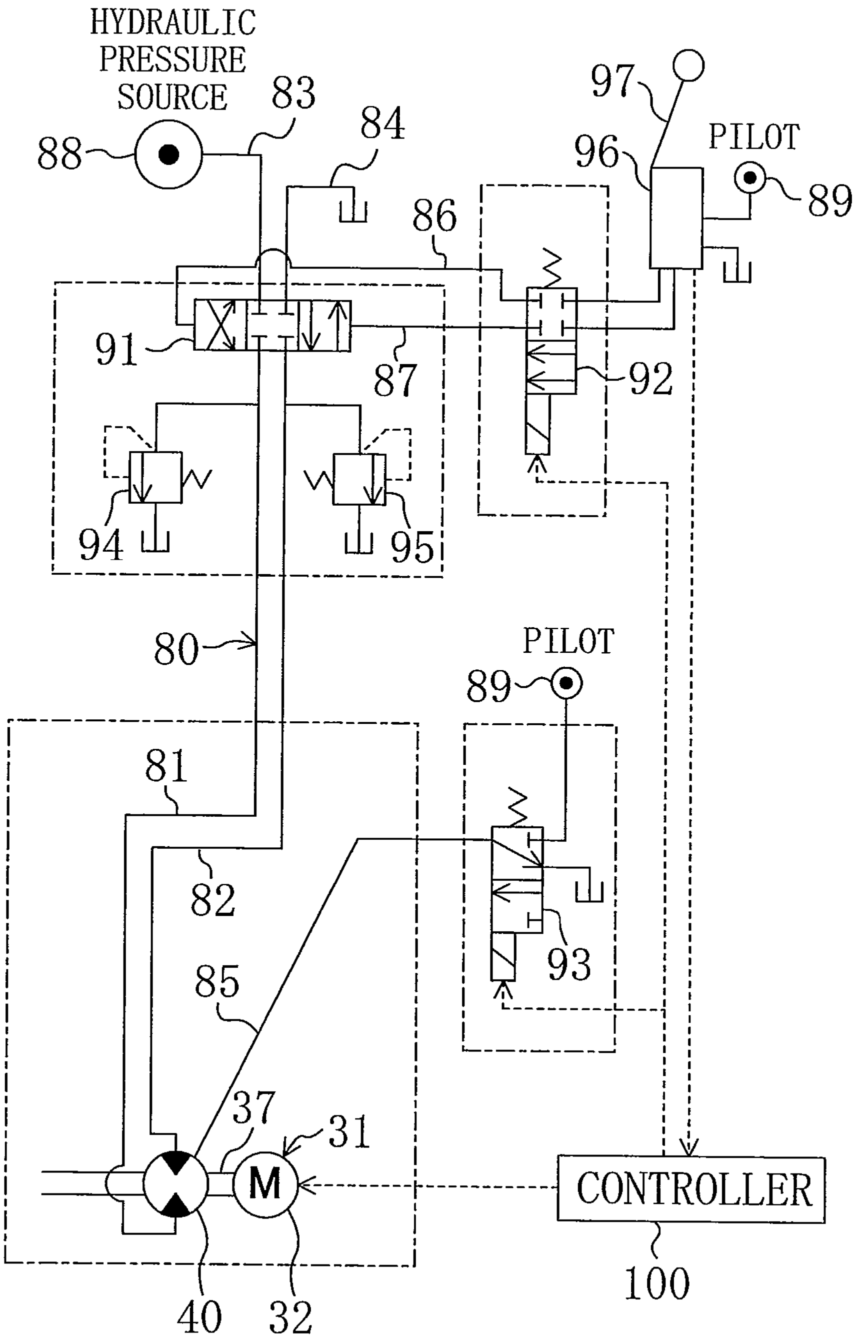
FIG. 6 is a hydraulic circuit diagram illustrating the structure of the hydraulic circuit and a switching valve, etc., when the hydraulic motor is suspended.

In the state where the operation of driving the output shaft (35) by the hydraulic motor (40) is not performed, the switching valve (91) is set to the neutral state, the pilot valve (93) is set to the OFF state, and the switching solenoid valve (92) is set to the OFF state as shown in FIG. 6. When the pilot valve (93) is in the OFF state, the engagement/disengagement member (71) of the hydraulic motor (40) is pushed down by the coil spring (77), and the rotor (52) is disengaged from the motor shaft (37) (see FIG. 3).

To fix the upper rotating structure (20), the rotation of the output shaft (35) of the rotation motor (31) has to be inhibited. However, the electric motor cannot generate electric power for holding the output shaft (35) stationary against externally applied torque. Therefore, when the upper rotating structure (20) is driven only by the electric motor, a brake for inhibiting the rotation of the output shaft (35) has to be actuated.

In the present embodiment, when the switching valve (91) is set to the neutral state (the state shown in FIG. 6), the hydraulic fluid is confined in the first main path (81) and the second main path (82) in the hydraulic circuit (80), and in the hydraulic motor (40). In this state, the rotor (52) of the hydraulic motor (40) does not rotate even when the external force is applied to the rotor (52). Therefore, by setting the pilot valve (93) to the ON state (the state shown in FIG. 7), the rotor (52) is coupled to the motor shaft (37) through the clutch mechanism (70), thereby inhibiting the rotation of the output shaft (35). Thus, the present embodiment allows fixing of the upper rotating structure (20) without actuating the brake.

<Controller>

The operation of the controller (100) will be described with reference to FIG. 8.

Figure 8:
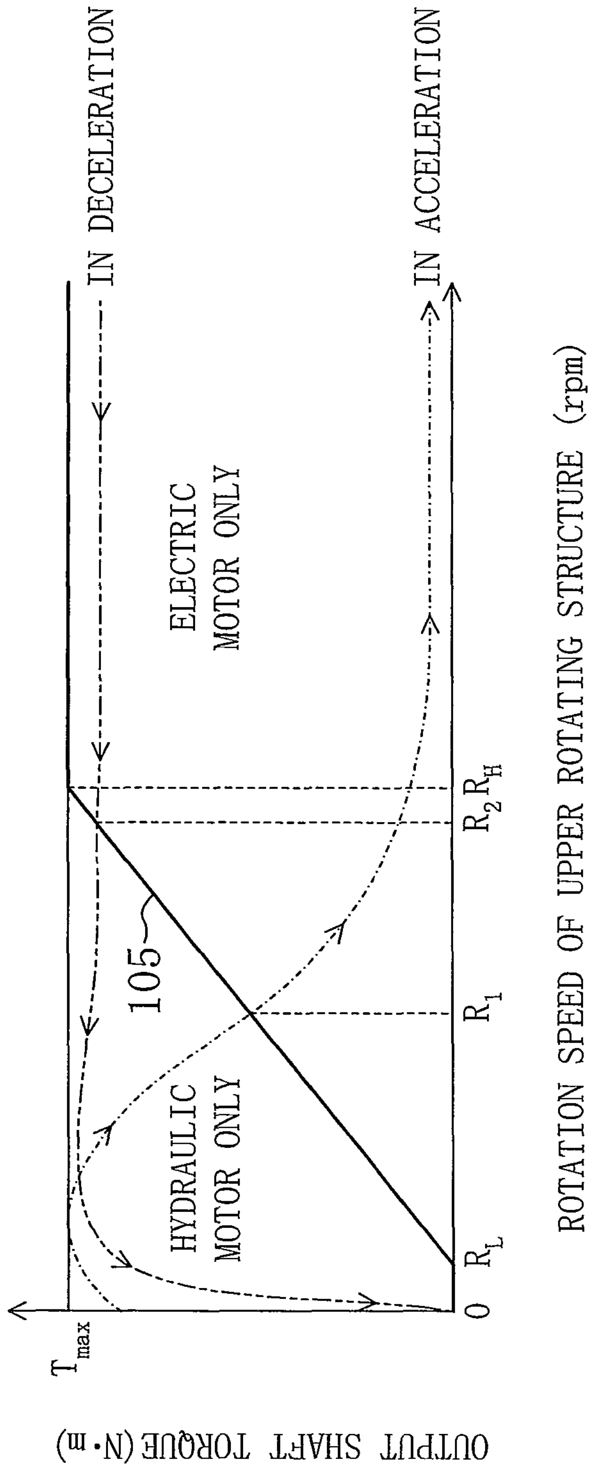
FIG. 8 is a view illustrating a control map of a controller of the first embodiment.

First, in accelerating the upper rotating structure (20) (i.e., in increasing the rotation speed of the upper rotating structure (20)), the required value T of the output shaft torque of the rotation motor (31) varies depending on the rotation speed R of the upper rotating structure (20) in many cases, as indicated by a dash-dot line in FIG. 8.

Specifically, the required value T of the output shaft torque is relatively high immediately after the start of the rotation of the upper rotating structure (20). Accordingly, in the rotation motor (31), the operation of driving the output shaft (35) by the hydraulic motor (40) is performed, and electric power is not fed to the electric motor (32). The required value T of the output shaft torque increases up to the maximum value $T_{max}$, and then gradually decreases.

When the rotation speed $R=R_1$, and the required value T of the output shaft torque lies on the reference torque line (105), the rotation motor (31) stops the operation of driving the output shaft (35) by the hydraulic motor (40), and starts the operation of driving the output shaft (35) by the electric motor (32). In this case, in the hydraulic motor (40), the pilot port (48) is disconnected from the pilot hydraulic pressure source (89), the engagement/disengagement member (71) is pushed down, and the rotor (52) is disengaged from the motor shaft (37).

Then, the required value T of the output shaft torque gradually decreases as the rotation speed R increases, and is kept substantially constant once the rotation speed R increases to a certain extent. During this period, the rotation motor (31) continuously performs the operation of driving the output shaft (35) only by the electric motor (32).

Then, in decelerating the upper rotating structure (20) (i.e., in decreasing the rotation speed of the upper rotating structure (20)), the required value T of the output shaft torque of the rotation motor (31) varies depending on the rotation speed R of the upper rotating structure (20) in many cases, as indicated by a dash-dot-dot line in FIG. 8.

Specifically, while the rotation speed R of the upper rotating structure (20) is rather high, the required value T of the output shaft torque is kept close to the maximum value $T_{max}$ of the output shaft torque. During this period, the electric motor (32) of the rotation motor (31) operates as an electric power generator. That is, the electric motor (32) of the rotation motor (31) is driven by the motor shaft (37) coupled to the output shaft (35), thereby converting kinetic energy of the upper rotating structure (20) to electric energy.

When the rotation speed $R=R_2$, and the required value T of the output shaft torque lies on the reference torque line (105), the rotation motor (31) stops the operation of decelerating the output shaft (35) by the electric motor (32), and starts the operation of decelerating the output shaft (35) by the hydraulic motor (40). In this operation, the hydraulic motor (40) is driven by the output shaft (35) to function as a pump, and slows the flow of the hydraulic fluid in the first main path (81) and the second main path (82) in the hydraulic circuit (80), thereby decelerating the output shaft (35).

After that, the required value T of the output shaft torque is kept close to the maximum value $T_{max}$ of the output shaft torque. After the rotation speed R decreases to nearly zero, the required value T of the output shaft torque gradually decreases as the rotation speed R decreases, and becomes zero when the upper rotating structure (20) stops. During this period, the rotation motor (31) continuously performs the operation of decelerating the output shaft (35) by the hydraulic motor (40).

In digging a trench by the hydraulic excavator (10), excavation may be performed with the bucket (28) of the hydraulic excavator (10) pressed against a side wall of the trench. In the hydraulic excavator (10) during this pressing excavation, the rotation motor (31) applies driving force to the upper rotating structure (20), thereby pressing the bucket (28) against the side wall of the trench. Therefore, the rotation motor (31) during the pressing excavation is required to generate relatively large rotary torque substantially without rotation of the output shaft (35).

In the hydraulic excavator (10) during the pressing excavation, the rotation speed R of the upper rotating structure (20) is low, and the required value T of the output shaft torque of the rotation motor (31) is high. Specifically, in the control map shown in FIG. 8, the operation during the pressing excavation corresponds to a region in which the operation of driving the output shaft (35) only by the hydraulic motor (40) is performed. Therefore, in the rotation motor (31) during the pressing excavation, the output shaft (35) is driven only by the hydraulic motor (40), and electric power is not fed to the electric motor (32).

Advantages of First Embodiment

According to the rotation motor (31) of the present embodiment, the operation of driving the output shaft (35) only by the hydraulic motor (40) is performed when the required value T of the output shaft torque is higher than the predetermined reference torque $T_b$. When the required value T of the output shaft torque is not higher than the reference torque $T_b$, the operation of driving the output shaft (35) only by the electric motor (32) is performed.

If the output shaft (35) is driven only by the electric motor (32) in the state where the rotation speed R of the upper rotating structure (20) is relatively low, and the required value T of the output shaft torque is relatively high, large current flows to the electric motor (32) substantially in a non-rotating state. This may possibly lead to generation of a large amount of heat in the electric motor (32), and to troubles such as burning of the coil, etc.

In contrast, according to the rotation motor (31) of the present embodiment, the output shaft (35) is driven only by the hydraulic motor (40) in the state where the driving of the output shaft (35) only by the electric motor (32) may possibly lead to excessive heat generation by the electric motor (32). Therefore, even in the state where the rotation speed R of the upper rotating structure (20) is relatively low, and the required value T of the output shaft torque is relatively high, the amount of heat generated by the electric motor (32) can reliably be reduced, thereby preventing the troubles caused by the heat generation by the electric motor (32).

In the operation of driving or decelerating the output shaft (35) by the electric motor (32), the rotor (52) is disengaged from the motor shaft (37) in the hydraulic motor (40) of the rotation motor (31), and the rotor (52) does not rotate together with the rotation of the motor shaft (37). Therefore, according to the rotation motor (31) of the present embodiment, rotary power of the output shaft (35) consumed by the suspended hydraulic motor (40) can be reduced to nearly zero.

As a result, in the operation of driving the output shaft (35) by the electric motor (32), the power wasted by the hydraulic motor (40) can be reduced to nearly zero, thereby maintaining high efficiency of the rotation motor (31). Further, in the operation of driving the electric motor (32) by the output shaft (35) during the deceleration of the upper rotating structure (20), the kinetic energy of the upper rotating structure (20) consumed by the hydraulic motor (40) can be reduced to nearly zero. This allows conversion of a larger amount of the kinetic energy of the upper rotating structure (20) into the electric energy by the electric motor (32).

Modified Example of First Embodiment

The control map of the present embodiment may contain, in addition to a region in which the output shaft (35) is driven only by the hydraulic motor (40) and a region in which the output shaft (35) is driven only by the electric motor (32), a region in which the output shaft (35) is driven by both of the hydraulic motor (40) and the electric motor (32).

In this case, the region in which the output shaft (35) is driven by both of the hydraulic motor (40) and the electric motor (32) is preferably provided between the region in which the output shaft (35) is driven only by the hydraulic motor (40) and the region in which the output shaft (35) is driven only by the electric motor (32). For example, when the rotation speed R increases during the acceleration of the upper rotating structure (20), the rotation motor (31) switches from the "operation of driving the output shaft (35) only by the hydraulic motor (40)" to the "operation of driving the output shaft (35) by both of the hydraulic motor (40) and the electric motor (32)," and then switches from the "operation of driving the output shaft (35) by both of the hydraulic motor (40) and the electric motor (32)" to the "operation of driving the output shaft (35) only by the electric motor (32)."

Second Embodiment

A second embodiment of the present embodiment will be described. A hydraulic excavator (10) of the present embodiment is obtained by changing the structure of the hydraulic motor (40) of the rotation motor (31) of the first embodiment. Differences between the hydraulic motor (40) of the present embodiment and that of the first embodiment will be described hereinafter.

Figure 9:
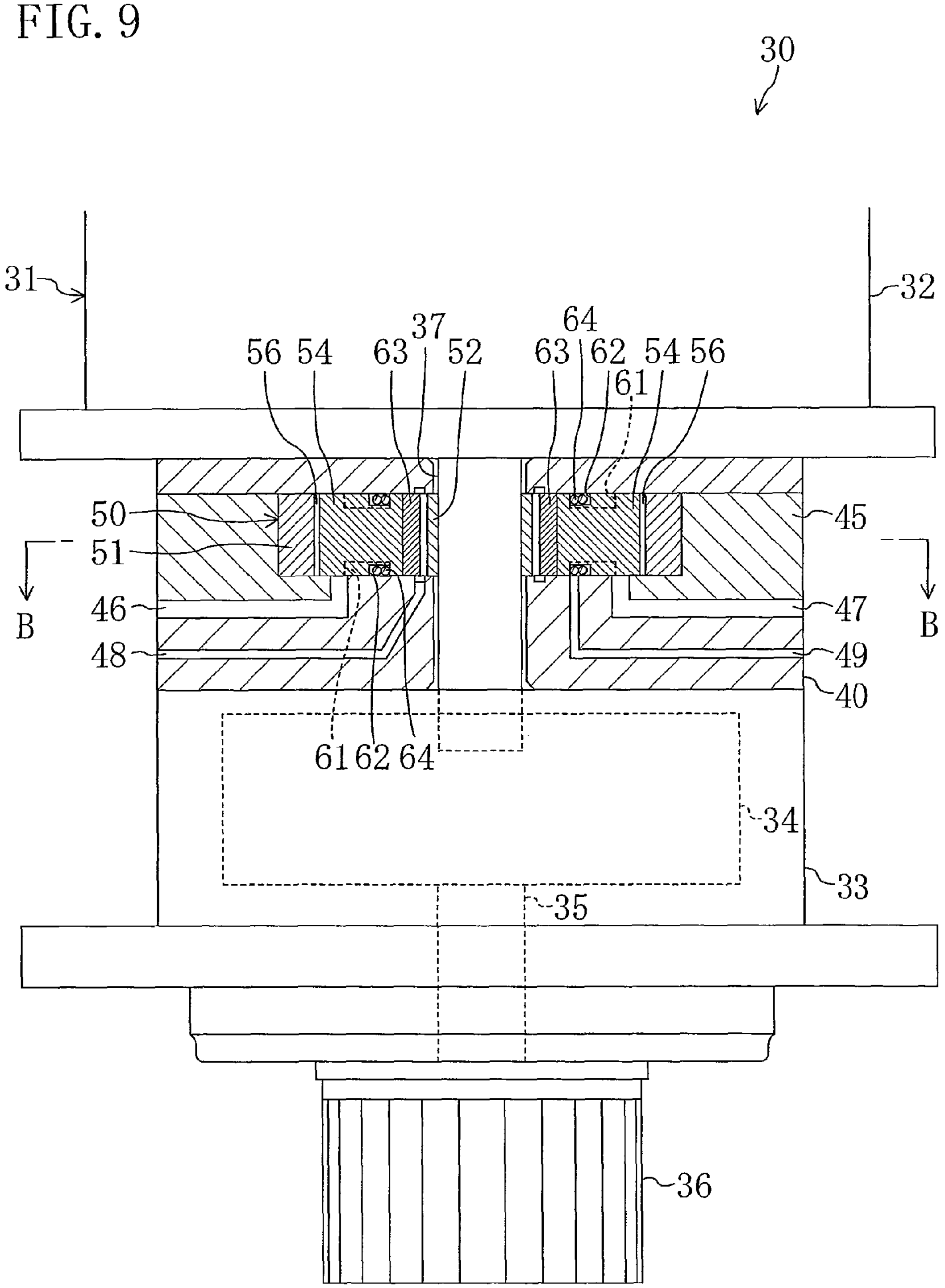
FIG. 9 is a partial cross-sectional view of a rotation motor illustrating the structure of a hydraulic motor of a second embodiment.
Figure 10:
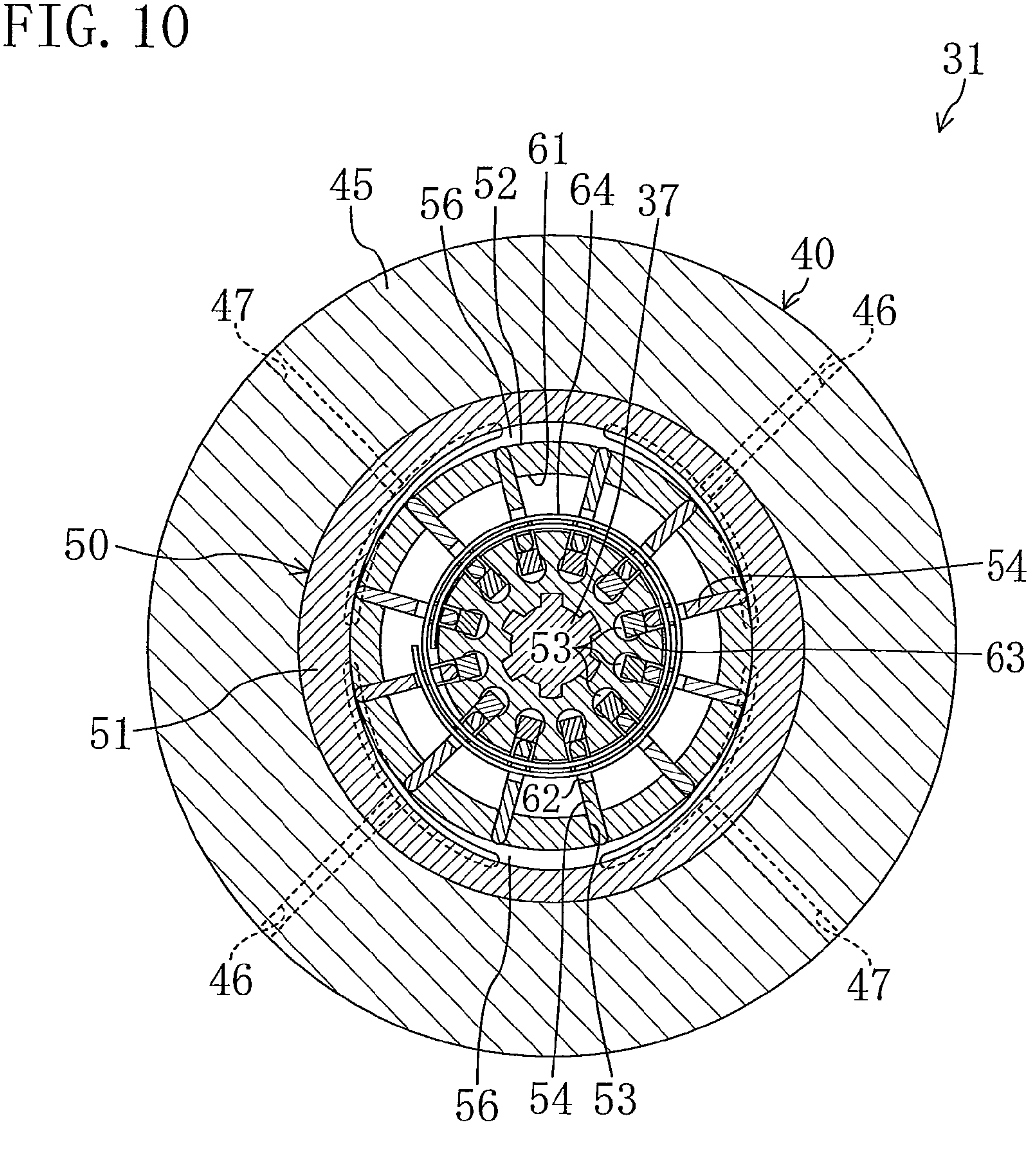
FIG. 10 is a cross-sectional view taken along the line B-B of FIG. 9 illustrating the hydraulic motor of the second embodiment in an idling operation.

As shown in FIGS. 9 and 10, the hydraulic motor (40) of the present embodiment does not include the clutch mechanism (70), but includes only the motor mechanism (50). In this hydraulic motor (40), a spline is formed in the inner circumferential surface of the rotor (52) of the motor mechanism (50), and the spline in the rotor (52) engages with a spline formed in the motor shaft (37). Specifically, in the hydraulic motor (40), the rotor (52) of the motor mechanism (50) is always coupled to the motor shaft (37).

The rotor (52) of the present embodiment includes circumferential grooves (61) formed in end faces thereof (an upper surface and a lower surface in FIG. 9), respectively. Each of the circumferential grooves (61) is a concave recess formed in the end face of the rotor (52), and has a center of curvature lying on a center axis of the rotor (52).

The rotor (52) of the present embodiment includes twelve guiding grooves (53). A portion of each of the guiding grooves (53) near the center of the rotor (52) is wider than a portion near the outer circumference of the rotor (52). A vane (54) and a push piston (63) are inserted in each of the guiding grooves (53) of the rotor (52). The push piston (63) is a prism-shaped piece, and is inserted in the guiding groove (53) with the longitudinal direction thereof being parallel to the axial direction of the rotor (52). The push piston (63) is thicker than the vane (54).

In each of the guiding grooves (53), the push piston (63) is arranged inside (near the center of the rotor (52)), and the vane (54) is arranged outside (near the outer circumference of the rotor (52)). The vane (54) and the push piston (63) are both capable of moving back and forth in the radial direction of the rotor (52). Side surfaces of the vane (54) are in contact with and slide along side walls of the narrower portion of the guiding groove (53). Side surfaces of the push piston (63) are in contact with and slide along side walls of the wider portion of the guiding groove (53).

Each vane (54) has notches (62) formed in an upper surface and a lower surface thereof, respectively. The notch (62) is formed near a proximal end of the vane (54) (near the center of the rotor (52)). The notch (62) is arranged in such a manner that at least part thereof overlap with the circumferential groove (61) of the rotor (52), irrespective of the position of the vane (54).

A ring spring (64) is provided in each of the circumferential grooves (61) formed in the end faces of the rotor (52). The ring spring (64) is made of a spiral-shaped metallic wire. The ring spring (64) is arranged to surround an inner circumferential wall of the circumferential groove (61) of the rotor (52), and is fitted in the notch (62) of the vane (54). In the state where the vane (54) and the push piston (63) are pulled toward the center of the rotor (52) (in the state shown in FIG. 10), the ring spring (64) carries no load, or slightly extends radially outward. That is, the ring spring (64) is fitted in the notch (62) of the vane (54) so as to exert force in the direction toward the center of the rotor (52) on each vane (54).

In the hydraulic motor (40) of the present embodiment, the housing (45) includes a first port (46), a second port (47), a pilot port (48), and an oil return port (49). The shape and the positions of the ends of the first port (46) and the second port (47) are the same as those described in the first embodiment. In the same manner as in the first embodiment, the first port (46) is connected to the first main path (81) of the hydraulic circuit (80), and the second port (47) is connected to the second main path (82) of the hydraulic circuit (80).

In the hydraulic motor (40), an end of the pilot port (48) is opened in the housing (45) to face an end surface of the rotor (52). Specifically, the end of the pilot port (48) is opened to communicate with the bottom of the guiding groove (53) in the rotor (52) (the end of the guiding groove near the center of the rotor (52)). In the same manner as in the first embodiment, the pilot port (48) is connected to the pilot path (85) of the hydraulic circuit (80).

In the hydraulic motor (40), an end of the oil return port (49) is opened in the housing (45) to face the circumferential groove (61) of the rotor (52). The oil return port (49) is connected to the hydraulic fluid tank (22). Pressure of the hydraulic fluid filling the circumferential groove of the rotor (52) is substantially equal to the pressure inside the hydraulic fluid tank (22) (substantially equal to atmospheric air).

—Operation Mechanism—

An operation mechanism of the hydraulic motor (40) of the present embodiment will be described. The hydraulic motor (40) is configured to be able to switch between a driving operation of driving the motor shaft (37) to rotate by the rotor (52), and an idling operation of idling the rotor (52) coupled to the motor shaft (37).

Figure 11:
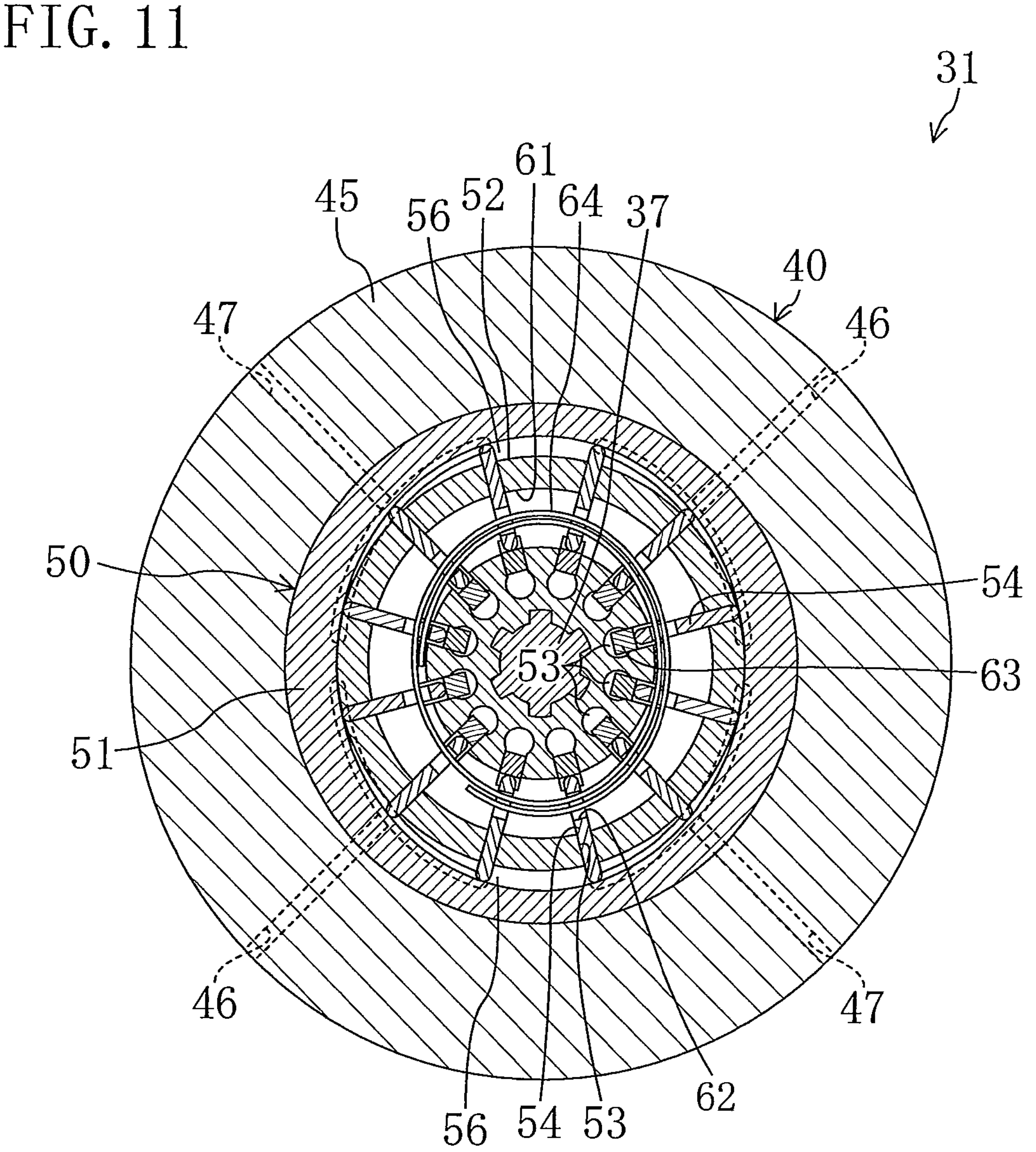
FIG. 11 is a cross-sectional view taken along the line B-B of FIG. 9 illustrating the hydraulic motor of the second embodiment in a driving operation.

In the hydraulic motor (40) in the driving operation, the hydraulic fluid from the pilot hydraulic pressure source (89) is fed to the bottom of each guiding groove (53) through the pilot port (48). Once the high pressure hydraulic fluid enters the bottom of the guiding groove (53), hydraulic pressure of the hydraulic fluid is exerted on the side surface of the push piston (63) facing the center of the rotor (52), and the push piston (63) is pushed radially outside the rotor (52) as shown in FIG. 11. Further, the vane (54) is pushed by the push piston (63). The vane (54) pushed by the push piston (63) moves radially outward, while deforming the ring spring (64). Then, the tip end of the vane (54) is pushed onto the inner circumferential surface of the cam ring (51).

In this state, the hydraulic motor (40) performs the same operation as described in the first embodiment. Specifically, in the state where the first port (46) is connected to the hydraulic pressure source (88), and the second port (47) is connected to the hydraulic fluid tank (22), the high pressure hydraulic fluid flows into the hydraulic fluid chamber (56) through the first port (46), thereby rotating the rotor (52) to the left in FIG. 11. In the state where the second port (47) is connected to the hydraulic pressure source (88), and the first port (46) is connected to the hydraulic fluid tank (22), the high pressure hydraulic fluid flows into the hydraulic fluid chamber (56) through the second port (47), thereby rotating the rotor (52) to the right in FIG. 11.

In the hydraulic motor (40) in the idling operation, the pilot port (48) is connected to the hydraulic fluid tank (22). In this state, the vane (54) and the push piston (63) are pulled toward the center of the rotor (52) by the ring spring (64), thereby pushing the hydraulic fluid from the guiding groove (53) to the pilot port (48). In the state where the vane (54) is pulled toward the center of the rotor (52), the end of the vane (54) is flush with the outer circumferential surface of the rotor (52), or is slightly shifted inside the outer circumferential surface of the rotor (52).

As described above, in the hydraulic motor (40) of the present embodiment, the rotor (52) is always coupled to the motor shaft (37). Therefore, also in the hydraulic motor (40) during the idling operation, the rotor (52) keeps rotating while the motor shaft (37) rotates. In the hydraulic motor (40) during the idling operation, the vane (54) is pulled toward the center of the rotor (52). Therefore, the rotor (52) rotating together with the motor shaft (37) hardly stirs the hydraulic fluid remaining in the hydraulic fluid chamber (56), thereby idling substantially without consuming the rotary torque of the motor shaft (37).

Advantages of Second Embodiment

Also in the present embodiment, selection between the hydraulic motor (40) and the electric motor (32) is made based on the same control map as that of the first embodiment. Thus, like the first embodiment, the present embodiment makes it possible to reliably reduce the amount of heat generated by the electric motor (32) even in the state where the rotation speed R of the upper rotating structure (20) is relatively low, and the required value T of the output shaft torque is relatively high. Therefore, troubles caused by the heat generation by the electric motor (32) can be avoided in advance.

In the present embodiment, the hydraulic motor (40) in the idling operation idles substantially without consuming the rotary torque of the motor shaft (37). Thus, like the first embodiment, the present embodiment makes it possible to keep high efficiency of the rotation motor (31) in the operation of driving the output shaft (35) by the electric motor (32), and to increase electric power generated by the electric motor (32) in the operation of driving the electric motor (32) by the output shaft (35) in decelerating the upper rotating structure (20).

Modified Example of Second Embodiment

The vane (54) and the push piston (63) are separated members in the present embodiment. However, the vane (54) and the push piston (63) may be configured as an integral member.

Third Embodiment

A third embodiment of the present invention will be described. A hydraulic excavator (10) of the present embodiment is obtained by changing the structure of the rotation motor (31) of the first embodiment. Differences between the rotation motor (31) of the present embodiment and that of the first embodiment will be described hereinafter.

Figure 12:
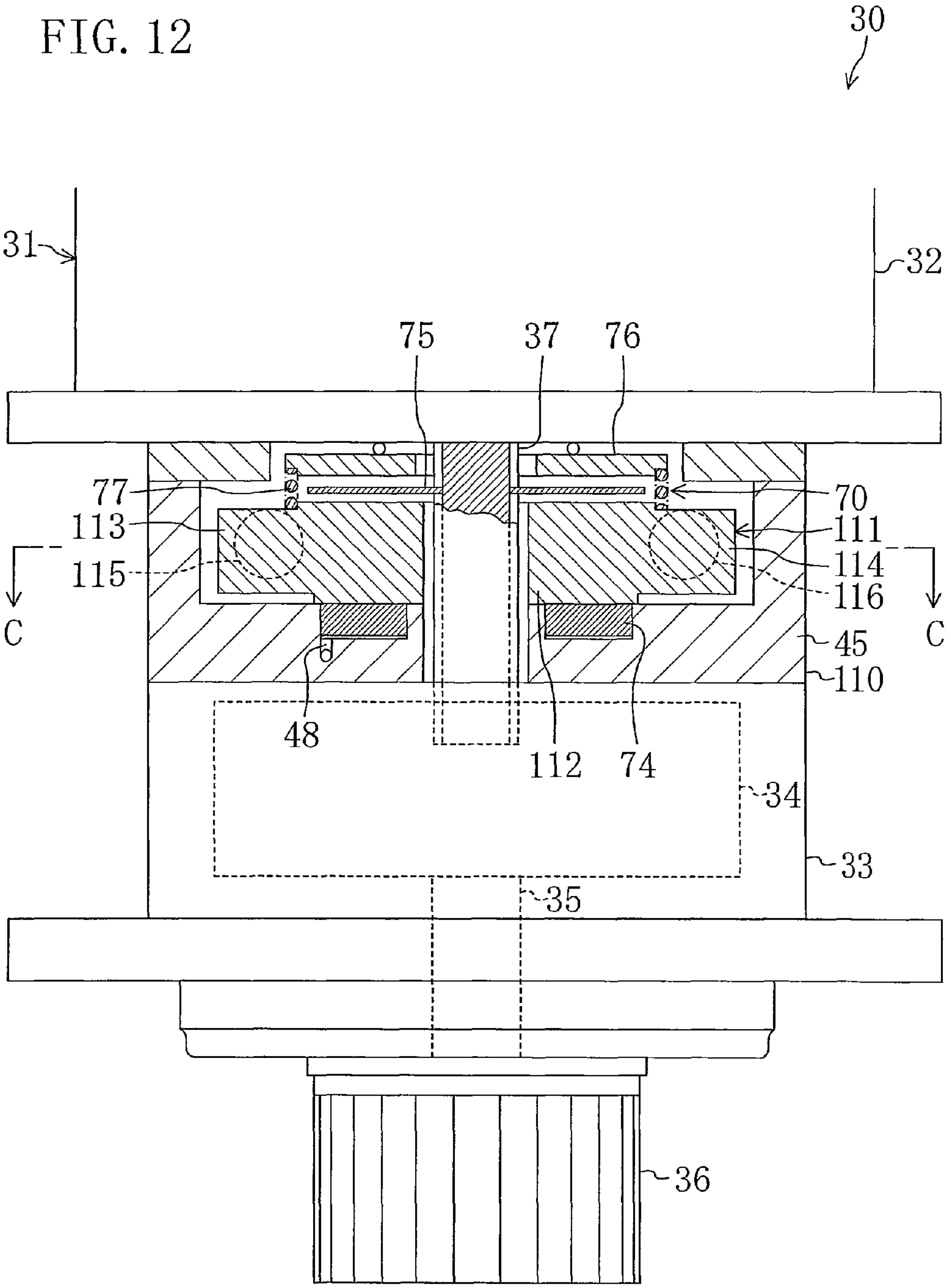
FIG. 12 is a partial cross-sectional view of a rotation motor illustrating an auxiliary drive mechanism of a third embodiment.
Figure 13:
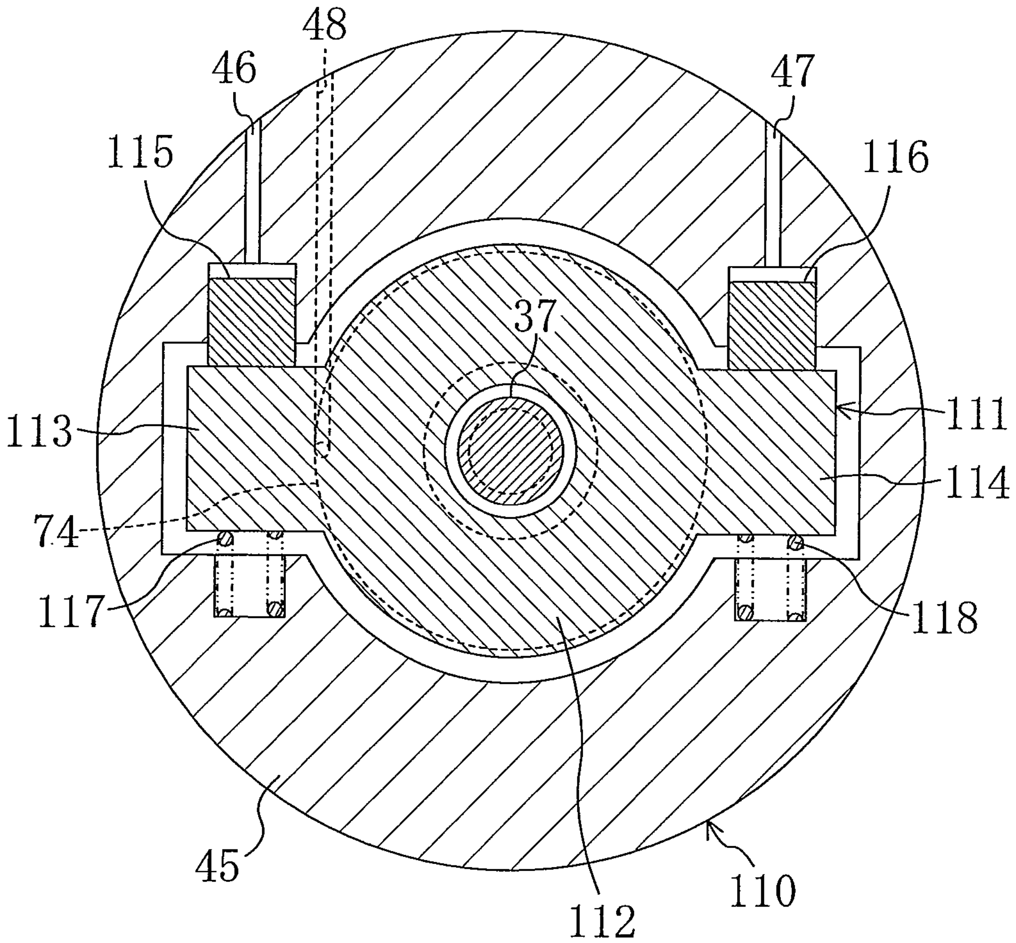
FIG. 13 is a cross-sectional view taken along the line C-C of FIG. 12 illustrating the structure of the auxiliary drive mechanism of the third embodiment.

As shown in FIGS. 12 and 13, the rotation motor (31) of the present embodiment includes an auxiliary drive mechanism (110) as the hydraulic mechanism, in place of the hydraulic motor (40) of the first embodiment. In this rotation motor (31), the structure of the clutch mechanism (70) is different from that of the first embodiment.

The auxiliary drive mechanism (110) includes a drive member (111), two drive pistons (115, 116), and two coil springs (117, 118). The auxiliary drive mechanism (110) is contained in the housing (45), like the hydraulic motor (40) of the first embodiment.

The drive member (111) includes a body (112) and two arms (113, 114). The body (112) is in the shape of an annular ring (or a doughnut) having a rectangular cross section. Each of the arms (113, 114) is formed to extend radially outward from an outer circumferential surface of the body (112). Each of the arms (113, 114) is substantially in the shape of a prism, and they protrude outward from the body (112) in directions opposite from each other. Specifically, the two arms (113, 114) are arranged on the circumference of the body (112) to be separated from each other by 180°, and extend along a straight line overlapping with the diameter of the body (112).

The drive member (111) receives a motor shaft (37) inserted in the body (112), and is arranged to be substantially coaxial with the motor shaft (37). The drive member (111) is rotatable about the motor shaft (37), and is slidable in the axial direction of the motor shaft (37).

Each of the two drive pistons (115, 116) is in the shape of a relatively short, solid cylinder. A first drive piston (115) is arranged laterally next to a first arm (113). A second drive piston (116) is arranged laterally next to a second arm (114). Each of the drive pistons (115, 116) is inserted in a hole formed in the housing (45), and is able to move back and forth in its axial direction (the vertical direction in FIG. 13). Each of the drive pistons (115, 116) is arranged in such a manner that one of its end surfaces (a lower end surface in FIG. 13) faces one of the side surfaces (an upper side surface in FIG. 13) of the corresponding arm (113, 114).

The two coil springs (117, 118) are arranged laterally next to the corresponding arms (113, 114), respectively. Each of the coil springs (117, 118) is arranged to oppose the drive piston (115, 116) with the corresponding arm (113, 114) sandwiched therebetween. An end of each of the coil springs (117, 118) abuts the other side surface (a lower side surface in FIG. 13) of the corresponding arm (113, 114) (a lower side surface in FIG. 13) to push the arm (113, 114) toward the drive piston (115, 116).

In the housing (45), an end of the first port (46) is opened to face the rear end surface of the first drive piston (115), and an end of the second port (47) is opened to face the rear end surface of the second drive piston (116). In the same manner as in the first embodiment, the first main path (81) of the hydraulic circuit (80) is connected to the first port (46), and the second main path (82) of the hydraulic circuit (80) is connected to the second port (47). When hydraulic pressure is exerted on the rear end surface of the drive piston (115, 116), the drive piston (115, 116) is pushed out, and the arm (113, 114) is pushed by the drive piston (115, 116), thereby rotating the drive member (111).

The clutch mechanism (70) of the present embodiment does not have the engagement/disengagement member (71), and the drive member (111) also functions as the engagement/disengagement member (71). In the clutch mechanism (70), a friction disc (75) is arranged in such a manner that a lower surface thereof faces an upper surface of the body (112) of the drive member (111). In the same manner as in the first embodiment, the friction disc (75) is fitted in a spline formed in the motor shaft (37), thereby rotating together with the motor shaft (37), and being slidable in the axial direction of the motor shaft (37). Further, in the clutch mechanism (70), a thrust bearing (76) is arranged between the friction disc (75) and the electric motor (32) in the same manner as in the first embodiment.

In this clutch mechanism (70), the engagement/disengagement piston (74) is in the shape of a flat annular ring having a rectangular cross section, and is arranged in such a manner that an upper surface thereof faces a lower surface of the body (112) of the drive member (111). In the housing (45), an end of the pilot port (48) is opened toward a lower surface of the engagement/disengagement piston (74). A pilot path (85) of the hydraulic circuit (80) is connected to the pilot port (48). When the hydraulic pressure is exerted on the lower surface of the engagement/disengagement piston (74), the engagement/disengagement piston (74) is pushed upward, and the drive member (111) is pushed upward by the engagement/disengagement piston (74). Then, the friction disc (75) is sandwiched between the drive member (111) and the thrust bearing (76), thereby coupling the drive member (111) and the motor shaft (37) through the friction disc (75).

—Operation Mechanism—

According to the rotation motor (31) of the present embodiment, an operation of driving of the output shaft (35) by the auxiliary drive mechanism (110) is performed only in the state where the required value of the rotary torque of the output shaft (35) is high, although the output shaft (35) hardly rotates (e.g., in the state of pressing excavation). In the other state, an operation of driving the output shaft (35) by the electric motor (32) is performed.

The operation of driving the output shaft (35) by the auxiliary drive mechanism (110) will be described. In this operation, the pilot port (48) is connected to the pilot hydraulic pressure source (89) through the pilot path (85). Then, the engagement/disengagement piston (74) is pushed upward, and the drive member (111) is coupled to the motor shaft (37) through the friction disc (75).

Also in this operation, one of the first port (46) and the second port (47) is connected to the hydraulic pressure source (88), and the other is connected to the hydraulic fluid tank (22).

First, the case in which the first port (46) is connected to the hydraulic pressure source (88) through the first main path (81), and the second port (47) is connected to the hydraulic fluid tank (22) through the second main path (82) will be described. In this case, hydraulic pressure of the hydraulic fluid flowing from the hydraulic pressure source (88) is exerted on the rear surface of the first drive piston (115), thereby pushing the first drive piston (115) toward the first arm (113) of the drive member (111). Then, the first drive piston (115) pushes the first arm (113) downward in FIG. 13, thereby rotating the drive member (111) to the left in FIG. 13 by a predetermined angle. When the first port (46) is disconnected from the hydraulic pressure source (88), the drive member (111) rotates to the right in FIG. 13 due to the force applied by the coil spring (117) abutting the first arm (113), thereby pushing the first drive piston (115) back.

Then, the case in which the first port (46) is connected to the hydraulic fluid tank (22) through the first main path (81), and the second port (47) is connected to the hydraulic pressure source (88) through the second main path (82) will be described. In this case, the hydraulic pressure of the hydraulic fluid flowing from the hydraulic pressure source (88) is exerted on the rear surface of the second drive piston (116), thereby pushing the second drive piston (116) toward the second arm (114) of the drive member (111). Then, the second drive piston (116) pushes the second arm (114) downward in FIG. 13, thereby rotating the drive member (111) to the right in FIG. 13 by a predetermined angle. When the second port (47) is disconnected from the hydraulic pressure source (88), the drive member (111) rotates to the left in FIG. 13 due to the force applied by the coil spring (118) abutting the second arm (114), thereby pushing the second drive piston (116) back.

In the operation of driving the output shaft (35) by the electric motor (32), the pilot port (48) is disconnected from the pilot hydraulic pressure source (89). In this state, the drive member (111) is pushed downward by the force applied by the coil spring (77), and the engagement/disengagement piston (74) abutting the drive member (111) is also pushed downward. Therefore, the drive member (111) is disengaged from the motor shaft (37).

Fourth Embodiment

A fourth embodiment of the present invention will be described. A hydraulic excavator (10) of the present embodiment is obtained by changing the structure of the controller (100) of the first embodiment. The controller (100) of the present embodiment is applicable to the hydraulic excavator (10) of the second embodiment.

In the controller (100) of the present embodiment, the control map is different from that of the first embodiment. The control map of the controller (100) of the present embodiment will be described hereinafter with reference to FIG. 14.

The control map of the present embodiment is represented by Cartesian coordinates, in which a horizontal axis represents "rotation speed (rate of rotation) of the upper rotating structure (20)", and a vertical axis represents "an absolute value of torque of the output shaft of the rotation motor (31) (i.e., rotary torque of the output shaft (35))." This is the same as the control map of the first embodiment. In this control map, reference speed $R_b$ which is a reference value of the "rotation speed (rate of rotation) of the upper rotating structure (20)," and reference torque $T_b$ which is a reference value of the "absolute value of torque of the output shaft of the rotation motor (31)" are provided. The reference torque $T_b$ is smaller than the maximum value $T_{max}$ of the output shaft torque of the rotation motor (31).

The control map defines three regions.

A first region is determined by a value on the horizontal axis not smaller than the reference speed $R_b$, and a value on the vertical axis not smaller than 0 (zero) and not larger than the maximum torque $T_{max}$. When the operation state of the rotation motor (31) corresponds to the first region, the operation of driving the output shaft (35) by the electric motor (32) is performed, but the operation of driving the output shaft (35) by the hydraulic motor (40) is not performed.

A second region is determined by a value on the horizontal axis not smaller than 0 (zero) and smaller than the reference speed $R_b$, and a value on the vertical axis larger than the reference torque $T_b$ and not larger than the maximum torque $T_{max}$. When the operation state of the rotation motor (31) corresponds to the second region, the operation of driving the output shaft (35) by both of the electric motor (32) and the hydraulic motor (40) is performed. In this operation, the output of the hydraulic motor (40) is kept constant irrespective of the require value of the output shaft torque of the rotation motor (31), while the output of the electric motor (32) is adjusted depending on the require value of the output shaft torque of the rotation motor (31).

A third region is determined by a value on the horizontal axis not smaller than 0 (zero) and smaller than the reference speed $R_b$, and a value on the vertical axis not smaller than 0 (zero) and not larger than the reference torque $T_b$. When the operation state of the rotation motor (31) corresponds to the third region, the operation of driving the output shaft (35) only by the hydraulic motor (40) is performed. In this case, the output of the hydraulic motor (40) is kept constant irrespective of the require value of the output shaft torque of the rotation motor (31). Also in this case, the operation of driving the electric motor (32) by the motor shaft (37) to generate electric power is performed, and the amount of electric power generated by the electric motor (32) is adjusted to control the rotary torque (i.e., the output torque) of the output shaft (35).

—Operation Mechanism—

The operation of the controller (100) will be described with reference to FIG. 14.

Figure 14:
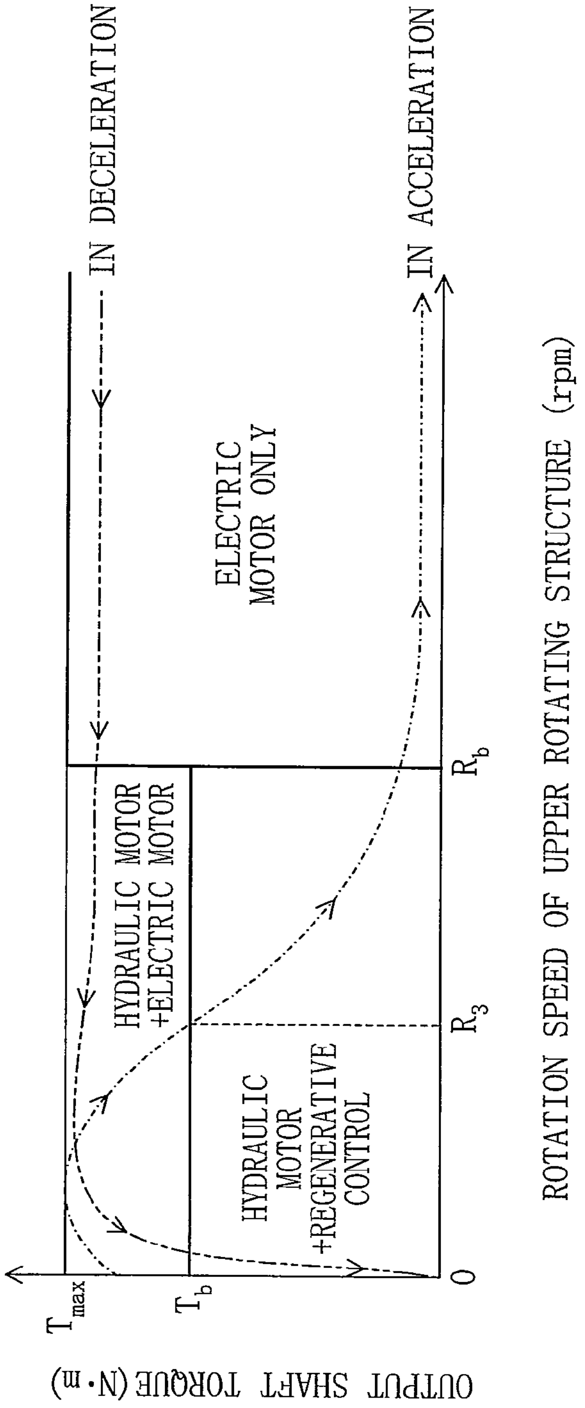
FIG. 14 is a graph illustrating a control map of a controller of a fourth embodiment.

First, in accelerating the upper rotating structure (20) (i.e., in increasing the rotation speed of the upper rotating structure (20)), the required value T of the output shaft torque of the rotation motor (31) varies depending on the rotation speed R of the upper rotating structure (20) in many cases, as indicated by a dash-dot line in FIG. 14.

Specifically, the required value T of the output shaft torque is relatively high immediately after the start of the rotation of the upper rotating structure (20). Accordingly, in the rotation motor (31), the output shaft (35) is driven by both of the hydraulic motor (40) and the electric motor (32). In this case, the output of the hydraulic motor (40) is kept constant, and the output shaft torque of the rotation motor (31) is controlled by controlling the output of the electric motor (32). The required value T of the output shaft torque increases up to the maximum value $T_{max}$, and then gradually decreases.

When the rotation speed $R=R_3$, and the required value T of the output shaft torque is equal to the reference torque $T_b$, the rotation motor (31) stops electric power supply to the electric motor (32), and starts the operation of driving the output shaft (35) only by the hydraulic motor (40). After that, the required value T of the output shaft torque gradually decreases as the rotation speed R increases. Thus, the amount of electric power generated by the electric motor (32) increases as the rotation speed R increases, thereby reducing the rotary torque of the output shaft (35) of the rotation motor (31).

When the rotation speed $R=R_b$, the rotation motor (31) stops the operation of driving the output shaft (35) by the hydraulic motor (40), and starts the operation of driving the output shaft (35) by the electric motor (32). In this case, in the hydraulic motor (40), the pilot port (48) is disconnected from the pilot hydraulic pressure source (89), the engagement/disengagement member (71) is pushed upward, and the rotor (52) is disengaged from the motor shaft (37).

Then, the required value T of the output shaft torque slightly decreases as the rotation speed R increases, and then is kept substantially constant. During this period, the rotation motor (31) continuously performs the operation of driving the output shaft (35) only by the electric motor (32).

Then, in decelerating the upper rotating structure (20) (i.e., in decreasing the rotation speed of the upper rotating structure (20)), the required value T of the output shaft torque of the rotation motor (31) varies depending on the rotation speed R of the upper rotating structure (20) in many cases, as indicated by a dash-dot-dot line in FIG. 14.

Specifically, while the rotation speed R of the upper rotating structure (20) is rather high, the required value T of the output shaft torque is kept close to the maximum value $T_{max}$ of the output shaft torque. During this period, the electric motor (32) of the rotation motor (31) operates as an electric power generator. That is, the electric motor (32) of the rotation motor (31) is driven by the motor shaft (37) coupled to the output shaft (35), thereby converting kinetic energy of the upper rotating structure (20) to electric energy.

When the rotation speed $R=R_b$, the rotation motor (31) starts the operation of decelerating the output shaft (35) by both of the hydraulic motor (40) and the electric motor (32). In this operation, the hydraulic motor (40) is driven by the output shaft (35) to function as a pump, and slows the flow of the hydraulic fluid in the first main path (81) and the second main path (82) in the hydraulic circuit (80), thereby decelerating the output shaft (35). The electric motor (32) is continuously driven by the output shaft (35) to generate electric power. Then, the operation of decelerating the output shaft (35) by both of the hydraulic motor (40) and the electric motor (32) is continuously performed until the upper rotating structure (20) stops.

As described in the first embodiment, in digging a trench by the hydraulic excavator (10), excavation may be performed with the bucket (28) of the hydraulic excavator (10) pressed against a side wall of the trench.

In the hydraulic excavator (10) during this pressing excavation, the rotation speed R of the upper rotating structure (20) is low, and the required value T of the output shaft torque of the rotation motor (31) is high. Specifically, in the control map shown in FIG. 14, the operation state in the pressing excavation corresponds to a region in which the output shaft (35) is driven by both of the hydraulic motor (40) and the electric motor (32). Therefore, in the rotation motor (31) during the pressing excavation, high pressure hydraulic fluid is supplied from the hydraulic pressure source (88) to the hydraulic motor (40), and electric power is fed to the electric motor (32).

In this way, in the rotation motor (31) of the present embodiment, the output shaft (35) is driven by both of the hydraulic motor (40) and the electric motor (32) when the rotation speed R of the upper rotating structure (20) is relatively low, and the required value T of the output shaft torque is relatively high. Therefore, as compared with the case where the output shaft (35) is driven only by the electric motor (32), electric current flowing to the electric motor (32) can be reduced, thereby reducing the amount of heat generated by the electric motor (32). This can prevent troubles caused by the heat generation by the electric motor (32) in advance.

Other Embodiments

First Modified Example

The rotation motor (31) of the above-described embodiments is configured to be able to perform the operation of decelerating the output shaft (35) by the hydraulic motor (40) in decelerating the upper rotating structure (20). However, the rotation motor (31) may perform only the operation of decelerating the output shaft (35) by the electric motor (32).

In the rotation motor (31) of this modified example, the control operation based on the control map of the controller (100) is performed in accelerating the upper rotating structure (20), and the operation of decelerating the output shaft (35) by the electric motor (32) is performed in decelerating the upper rotating structure (20). Specifically, the electric motor (32) is driven by the output shaft (35) to perform only the operation of generating electric power by the electric motor (32) until the upper rotating structure (20) stops. This allows conversion of a larger amount of the kinetic energy of the upper rotating structure (20) into the electric power by the electric motor (32), thereby improving the efficiency of the drive (30) for driving the upper rotating structure (20).

Second Modified Example

In the rotation motor (31) of the first, second and fourth embodiments, the motor mechanism (50) of the hydraulic motor (40) includes a vane-type hydraulic motor. However, the type of the hydraulic motor (40) of the motor mechanism (50) is not limited to the vane-type. For example, a gear motor including two gears, or a so-called radial piston hydraulic motor may be used for the motor mechanism (50).

The above embodiments are merely preferred embodiments in nature, and are not intended to limit the scope, applications and use of the invention.

INDUSTRIAL APPLICABILITY

As described above, the present invention is useful for a drive for rotating a rotating structure, such as an upper rotating structure of a hydraulic excavator, etc.

The invention claimed is:

1. A drive for rotating a rotating structure (20) rotatably mounted on a non-rotating structure (11), the drive comprising:

an electric motor (32) which receives electricity and generates driving force;

a hydraulic mechanism (40, 110) which receives hydraulic fluid and generates driving force; and an output shaft (35) which is driven to rotate by the electric motor (32) and the hydraulic mechanism (40, 110), wherein an operation of driving the output shaft (35) only by the hydraulic mechanism (40, 110) is selectively performed when rotation speed of the rotating structure (20) is lower than a predetermined reference speed, and an operation of driving the output shaft (35) only by the electric motor (32) is performed when the rotation speed of the rotating structure (20) is not lower than the reference speed.

2. The drive for the rotating structure of claim 1, wherein the operation of driving the output shaft (35) only by the hydraulic mechanism (40, 110) and the operation of driving the output shaft (35) only by the electric motor (32) are selectively performed when the rotation speed of the rotating structure (20) is lower than the reference speed.

3. The drive for the rotating structure of claim 2, wherein in the case where the rotation speed of the rotating structure (20) is lower than the reference speed, the operation of driving the output shaft (35) only by the hydraulic mechanism (40, 110) is performed when a required value of output torque which is rotary torque of the output shaft (35) is higher than a predetermined reference torque, and the operation of driving the output shaft (35) only by the electric motor (32) is performed when the required value of the output torque is not higher than the reference value.

4. The drive for the rotating structure of claim 3, wherein provided that the reference speed is a higher reference speed, and a value lower than the higher reference speed is a lower reference speed, the reference torque is set to zero when the rotation speed of the rotating structure (20) is not higher than the lower reference speed, and the reference torque is set to a predetermined value higher than zero when the rotation speed of the rotating structure (20) is higher than the lower reference speed and lower than the higher reference speed.

5. The drive for the rotating structure of claim 4, wherein the reference torque is set higher when the rotation speed of the rotating structure (20) is higher in the case where the rotation speed of the rotating structure (20) is higher than the lower reference speed and lower than the higher reference speed.

6. The drive for the rotating structure of claim 1, wherein the operation of driving the output shaft (35) only by the hydraulic mechanism (40, 110) and the operation of driving the output shaft (35) by both of the hydraulic mechanism (40, 110) and the electric motor (32) are selectively performed when the rotation speed of the rotating structure (20) is lower than the reference speed.

7. The drive for the rotating structure of claim 6, wherein in the case where the rotation speed of the rotating structure (20) is lower than the reference speed, the operation of driving the output shaft (35) by both of the hydraulic mechanism (40, 110) and the electric motor (32) is performed when a required value of output torque which is rotary torque of the output shaft (35) is higher than a predetermined reference torque, and the operation of driving the output shaft (35) only by the hydraulic mechanism (40, 110) is performed when the required value of the output torque is not higher than the reference torque.

8. The drive for the rotating structure of claim 7, wherein when the rotation speed of the rotating structure (20) is lower than the reference speed, and the required value of the output torque is not higher than the reference torque, the electric motor (32) is driven by the output shaft (35) to generate electric power, and an amount of the electric power generated by the electric motor (32) is adjusted to adjust the output torque.

9. The drive for the rotating structure of claim 8, wherein when the rotation speed of the rotating structure (20) is lower than the reference speed, and the required value of the output torque is not higher than the reference torque, driving torque applied from the hydraulic mechanism (40, 110) to the output shaft (35) is kept constant.

10. The drive for the rotating structure of claim 7, wherein when the rotation speed of the rotating structure (20) is lower than the reference speed, and the required value of the output torque is higher than the reference torque, driving torque applied from the hydraulic mechanism (40, 110) to the output shaft (35) is kept constant, and driving torque applied from the electric motor (32) to the output shaft (35) is adjusted to adjust the output torque.

11. The drive for the rotating structure of any one of claims 1 to 10, wherein the electric motor (32) is always coupled to the output shaft (35), and the hydraulic mechanism (40, 110) is configured to be able to engage with/disengage from the output shaft (35).

12. The drive for the rotating structure of any one of claims 1 to 10, wherein both of the electric motor (32) and the hydraulic mechanism (40, 110) are always coupled to the output shaft (35), and the hydraulic mechanism (40) is configured to be able to switch between a driving operation of receiving the hydraulic fluid and driving the output shaft (35) to rotate, and an idling operation of being driven by the output shaft (35) to idle.

* * * * *